United States Patent
Spinner

(10) Patent No.: US 6,731,937 B1
(45) Date of Patent: May 4, 2004

(54) CALL SET-UP CONTROL WITH AUTOMATIC RECALL IF BUSY SUBSCRIBER

(75) Inventor: Arno Spinner, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/275,824

(22) Filed: Mar. 25, 1999

(30) Foreign Application Priority Data

Mar. 31, 1998 (DE) .......................... 198 14 450

(51) Int. Cl.[7] ................................. H04Q 7/20
(52) U.S. Cl. ................. 455/445; 455/564; 455/414.1
(58) Field of Search .................. 455/414, 417, 455/445, 466, 517, 564, 565, 567, 550, 414.1–414.4; 379/196–200, 207.05, 207.06, 207.07, 209.01, 210.01, 210.02, 210.03, 211.01–214.01, 142.07

(56) References Cited

U.S. PATENT DOCUMENTS

| | | | | |
|---|---|---|---|---|
| 4,885,780 A | * | 12/1989 | Gopal et al. ........... | 379/221.01 |
| 5,243,646 A | * | 9/1993 | McCarthy ................. | 455/462 |
| 5,905,960 A | * | 5/1999 | Nicholl et al. ............ | 455/450 |
| 5,995,848 A | * | 11/1999 | Nguyen .................... | 455/528 |
| 6,360,109 B1 | * | 3/2002 | Thauvin et al. ............ | 455/564 |

FOREIGN PATENT DOCUMENTS

| | | | |
|---|---|---|---|
| JP | 03220960 | * | 9/1991 |
| JP | 09289540 | * | 11/1997 |
| WO | 9717794 | | 5/1997 |

OTHER PUBLICATIONS

Patent Abstracts of Japan, vol. 098, No. 003, Feb. 27, 1998 & JP 09 289540 A (Nec Corp), Nov. 4, 1997.

Patent Abstracts of Japan, vol. 015, No. 506 (E–1148), Dec, 20, 1991 & JP 03 220960 A (Fujitsu Ltd), Sep. 30, 1991.

GSM 03.93, draft version 0.14.0: "Technical Realisation of Completion of Calls to Busy Subscriber (CCBS)"; Stage 2, Section 5.2, Mar. 1993.

* cited by examiner

*Primary Examiner*—Sinh Tran
*Assistant Examiner*—Eliseo Ramos-Feliciano
(74) *Attorney, Agent, or Firm*—Nixon & Vanderhye P.C.

(57) ABSTRACT

The invention relates to a control apparatus (AGNT), a telecommunication system (SYS), a control method and a subscriber station (SS1, TE, MT; SS2, TE, MT; SS3, TE, MT) wherein a call set-up request issued by a first subscriber station (SS1) is blocked from a transfer to a telecommunication network (NET) as long as the second subscriber station (SS2) to which a call should be set-up is in a busy state. The control apparatus (AGNT) only transfers the call set-up request to the exchange means (MSC/VLR, GMSC, HLR) of the telecommunication network (NET) when the called second subscriber station (SS2) changes from a busy state into an idle state. Thus, the network resources are not occupied by call set-up requests which would be rejected due to the second subscriber station (SS2) being in a busy state. The invention is particularly advantageous when the calling subscriber station (SS1) uses a re-dial function to repeat a call set-up request. After several retries further retries will be blocked and the call will only be set-up when the second subscriber station becomes free. A particular advantageous application of the invention is to combine the blocking of call set-up requests by the control apparatus (AGNT) with a CCBS service implemented in the network (NET).

63 Claims, 10 Drawing Sheets

CALL SET-UP CONTROL WITH AUTOMATIC RECALL IF BUSY SUBSCRIBER

FIELD OF THE INVENTION

The invention relates to a control apparatus and a control method for controlling the set-up of calls between a first subscriber station and a second subscriber station which are connected to a telecommunication network. The invention also relates to a telecommunication system and a subscriber station comprising such a control apparatus.

Specifically the invention relates to telecommunication systems comprising a telecommunication network in which a CCBS (Completion Of Calls To Busy Subscriber) facility allows a calling subscriber station, which failed to set-up a call to a busy subscriber station, to be notified when the called busy subscriber station becomes idle again. When the notification takes place, the network offers automatic set-up (completion) of the call to the called subscriber station. Such a CCBS facility is used to take away the burden of successive re-dialing operations of the calling subscriber station to find out when the concerned second subscriber station becomes available again.

Without being limited thereto the present invention relates to the usage of the CCBS facility in order to set-up data calls between a first and second subscriber station. However, the invention is also applicable to the setting up of speech calls between the subscriber stations.

Although the standardization for the CCBS facility is currently on the way within the ETSI standardizing committees in view of the GSM telecommunication system (Global System of Mobile Communication) for standardizing the set-up of speech calls between subscriber stations using such a CCBS facility, the invention is not limited to GSM and is likewise applicable to any telecommunication system where call set-up requests need to be transferred through a telecommunication network to a subscriber station.

The CCBS supplementary service has been already standardized by ETSI for a fixed network N-ISDN. It may be noted that it is possible that the CCBS system of GSM and the CCBS system of the fixed network N-ISDN cooperate. For example, one terminal can be a N-ISDN terminal connected to the fixed N-ISDN network and another terminal can be a GSM mobile station.

BACKGROUND OF THE INVENTION

FIG. 6 shows an overview of a telecommunication system SYS including a telecommunication network NET and a plurality of subscriber stations SS1, SS2, SS3. The telecommunication network NET comprises an exchange means GMSC, MSC/VLR (A), MSC/VLR (B), HLR (A), HLR (B) for setting up calls between the subscriber stations and an operation state monitoring means CCBS, MON monitoring a respective operation state of the subscriber stations. Of course the network PLMN comprises other features (not shown) necessary for the operation of the network, for example the BSS (i.e. the GSM radio access network) including BSCs (i.e. base station controllers) and the BSs (i.e. the base stations). The BSS is provided between the mobile station MS and the mobile switching center MSC of the network PLMN. Although the BSS is not essential for operating the CCBS service, the CCBS service is exactly provided for the reason to save radio resources within the BSS which is the unit where resources will be occupied by the calls.

Although the operation state monitoring means CCBS, MON is illustrated as being incorporated in the telecommunication network NET, it may be located elsewhere in the telecommunication system, for example within the subscriber station itself or within an exchange means of other telecommunication-networks NET' which may be connected to the telecommunication network NET. Within the present specification the operation state monitoring means CCBS, MON is for simplicity assumed to be located in the telecommunication network NET. The main function of the operation state monitoring means CCBS, MON is to provide a simple notification mechanism which informs a calling subscriber station that a destination (another subscriber station) previously being busy has become idle.

In FIG. 6 an example is illustrated where the telecommunication network NET is constituted by a public land mobile radio communication network PLMN and the subscriber stations are mobile stations MS (A), MS (B), MS (C). In this case the exchange means comprises (in addition to other means like the BSS explained above) mobile switching centres MSC, visitor location registers VLR (A), VLR (B), home location registers HLR (A), HLR (B) and a gateway mobile switching centre GMSC. MSC/VLR (A), HLR (A) and MSC/VLR (B), HLR (B) are respectively provided for the mobile stations MS (A), MS (B) between which a call set-up will be considered below, whilst it should be noted that similar means (not shown) are provided for the third mobile station MS (C).

The dotted line between the public land mobile radio communication network PLMN and the respective mobile-stations MS (A), MS (B), MS (C) indicate the radio interface. Furthermore, although not illustrated in FIG. 6, it should be noted that the telecommunication network NET can be constituted by a plurality of networks, for example a public and mobile radio network PLMN and a public switched telephone network PSTN, wherein one or more of the subscriber stations SS1, SS2, SS3 may be a telephone of a fixed network.

SET-UP OF DATA CALLS

Although hereinafter with reference to FIGS. 7a, 7b the set-up of a call (the usual speech call) between the subscriber stations SS1, SS2, will be considered in view of the usage of the CCBS facility, it should be understood that the telecommunication network NET can also switch data calls which are for example issued by a subscriber station. SS3 which comprises a telephone equipment and a terminal equipment TE interconnected through a terminal-to-modem interface. In case the subscriber station SS3 is a mobile station MS (C) the telephone equipment is constituted by the mobile termination MT of type 2 (which means that the TDF (terminal adapter functions) are integrated).

It should be noted that FIG. 6 (and also FIG. 1 to be described below) only shows some common configurations of the subscriber stations including a mobile station e.g. consisting of a mobile termination MT and an interconnected terminal equipment TE. Here a mobile station MS can be regarded as the sum of terminal equipments handled by the user which can be either a mobile termination MT of type 0, a mobile termination of type 1 connected to an ISDN terminal, or a non-ISDN terminal connected to a mobile termination of type 2. The GSM standard GSM 04.02 Version 5.0.0: May 1996 defines the most common configurations used at the mobile stations. In the present specification, the term "mobile station" (see e.g. the mobile station MS (C) in FIG. 6) comprises all such configurations without limitation.

The terminal equipment TE may be a computer, e.g. a laptop, on which the data application is implemented. The computer is connected to the mobile termination MT through the interface as is shown in FIG. 6. The data application implemented on the computer may for example be a FAX application, an electronic mail application, a file transfer application, an Internet Access Application, etc. The terminal equipment TE requests the mobile termination MT to issue a data call dependent on the implemented or executed data application. In. GSM such data-calls are typically transparent or non-transparent circuit-switched connections of a certain data rate which support the said-FAX, electronic mail, file transfer or Internet Access Applications. Depending on the functionalities of the mobile station and of the exchange of the telecommunication network NET, the data calls may in the future also be packet-orientated, wherein in the telecommunication network NET, PLMN a GPRS (General Packet Radio Service) may be provided.

Regarding the data calls, for a GSM mobile equipment the GSM standard specification 07.07 has standardized the AT command set to be used for setting up data calls. The AT command set is an interface to enable the terminal equipment TE (e.g. a laptop) to control the connected mobile termination MT to set-up a data call. The current standardization GSM 07.07 provides no possibility to allow the mobile termination MT to differentiate between the different applications running on the terminal equipment TE. This means that the mobile termination MT will not be able to contact the right application in the terminal equipment TE when it gets the indication from the network that a remote user has become free. Currently ETSI SMG4 suggests a solution to introduce a multiplexing on this interface and how to handle backwards compatibility.

SET-UP OF SPEECH CALLS

Currently the ETSI standardization groups are working towards a standardization of the CCBS (Completion Of Calls To Busy Subscriber) supplementary service for GSM. CCBS—since it will become a standard—is one of the most-complex supplementary services. The CCBS recall handling within the mobile station is already for ordinary speech-calls (for example between the mobile stations MS (A), MS (B) one of the difficult key aspects to be implemented. The ETSI standardization has in principle agreed how to specify the recall handling for speech calls but has not really started the work for fax and data services.

Although the standardization process for the CCBS implementation is still on-going-and finalization can only be expected in early 1998, in principle the CCBS implementation is performed as shown in FIGS. 7a, 7b as is described in the GSM document 03.93. FIG. 7a shows a successful CCBS request where the called subscriber station B is in a busy state, when the call set-up request is issued by the first subscriber station A and where the subscriber station A is free (in an idle state) when the called subscriber station B becomes free (changes from a busy state to an idle state). The most important steps in the diagram in FIG. 7a will be explained hereinafter.

When the mobile station A (MS (A)) issues a call set-up request S1 this call set-up request is routed to the mobile switching centre MSC (B) (S2: Initial Address Message IAM; S3: Information Request; S4: Provide Roaming Number PRN; S5: Return Mobile Station Roaming Number MSRN; S6: Information Request Acknowledgment; S7: Initial Address Message) and the called subscriber station MS (B) is busy, a release message S8 is returned to the gateway MSC which routes the release message S9 to the mobile switching centre MSC of the mobile station MS (A). That is, if the second subscriber station is in a busy state, the operation state monitoring means CCBS, MON indicates to the first subscriber station MS (A) that the second subscriber station is in a busy state and that a CCBS activation is possible.

The first subscriber station may comprise an automatic recall means ARC (see FIG. 6) which provides a re-dial function to perform an automatic call set-up repetition as long as the call is not answered by the called subscriber station B. That is, without activating the CCBS facility the automatic recall means ARC will start again with step S1, i.e. it will repeat the call set-up request to the called subscriber station B and—if the second subscriber station is still busy—the call set-up will be again released by step S10.

The re-dial function (the automatic recall means) allows the execution of recalls within certain time intervals, e.g., every 60 seconds. The number of allowed re-dialings may be limited by a limitation means (as requested by law; for example applications are not allowed to support more than 20 re-dialings).

The reason why the number of re-attempts must be limited in the prior art is as follows. As is seen with steps S1–S10 in FIG. 7a, the automatic re-attempts to set-up a call in step S1 lead to the allocation of radio resources at the radio interface between the first subscriber station MS (A) and the exchange means MSC/VLR (A), HLR (A), GMSC, HLR (B), MSC (B). In addition, further resources within the radio access network (i.e. the BSS as explained above) are occupied. Essentially a signalling channel or even a traffic channel has to be set-up, cell changes of the called subscriber station might occur which need to be tracked, etc. Furthermore, terrestrial resources in the PLMN or a possibly connected external PSTN network need to be occupied. Thus, the many repetitions for setting up a call executed by an automatic recall means ARC use resources of the exchange means which are by most operators not charged, however prevent other users from making calls since the resources are occupied.

In order to reduce this problem, the calling subscriber station MS (A) may perform a CCBS activation in steps S11–S18, i.e. the user requests from the network the CCBS service for a specific call which has been rejected due to said called second subscriber station being in a busy state. After the CCBS request has been transferred to the home location register HLR (B) of the called subscriber station MS (B) in steps S11–S13, the CCBS facility (the operation state monitoring means) starts monitoring the second (busy) subscriber station in step S14 and an acknowledgment message CCBS request (Ack) is returned to the calling first subscriber station MS (A) through steps S15–S18.

After step S18 the operation state monitoring means CCBS, MON monitors the operation state of the called (busy) second subscriber station MS (B) and provides a CCBS recall function that consists of the notification that the busy second subscriber station has changed its operation state from a busy state to an idle state in steps S20–S23 if the release of the second subscriber station occurs in step S19. In step S22 a copy of the set-up message is provided and the CCBS recall message in step S23 requests the first subscriber station to perform a new call set-up (since the second subscriber station has become available for a call set-up). Instead of just requesting the first subscriber station to perform a re-dial (e.g. manually or via the automatic recall means ARC), the CCBS facility may also offer an automatic completion to the second subscriber station if this was requested by the first subscriber station initially when activating the CCBS facility in step S11 (of course this assumes that the first subscriber station is not busy at the time when the CCBS facility performs the call completion to the called second subscriber station which has become available again).

In response to the CCBS recall message, a call set-up request is transferred through steps S24–S32 whereafter an alert/connect message S35 is returned to the calling first subscriber station MS (A) through steps S33, S34 (ACM/ANM/CPG: acknowledge message/alert nominating message/call progress generation). The alert/connect message in step S35 indicates alerting of the second subscriber station that the call could be connected. In this connection, alert does not mean a failure but it is used for the providing of a ringing tone. If a call could be completed, then the HLR(B) is informed about this in step S37, the dialogue between the 2 HLRs is ended in step S38 and also the MSC(B) reports the successful call completion in step S39. In step S40 the CCBS facility stops its operation, i.e. the operation state monitoring means CCBS, MON stops the monitoring of the called second subscriber station, since a call was successfully set-up between the first and second subscriber stations.

As can be seen from FIG. 7a, steps S1–S10—when repeatedly executed—may be regarded as an automatic recall function ①. Steps S11–S18 may be regarded as the CCBS activation function ②. Steps S19–S23 relate to the CCBS recall function ③ and steps S24–S40 relate to the call completion function ④ after the second subscriber station has become free. The functions ②, ③, and ④ are part of the usual CCBS completion of calls to a busy subscriber.

In FIG. 7b the steps S1–S23 correspond to those in FIG. 7a and will not be explained again. That is, the functions ①, ②, ③ are the same. FIG. 7b differs from FIG. 7a in that the first subscriber station MS (A) is not in an idle state when the called subscriber station MS (B) becomes eventually available for a call set-up.

When for example a timer T10 expires in step S24', this means that there has not been received a user reaction or the indication that the called subscriber station is now free, since the timer waits for such a reaction or indication in a predetermined time (by contrast, the busy-state of the called subscriber station is detected by a means in MSC (A) directly). Therefore, when the timer expires in step S24', the monitoring of the second subscriber station and the provision of the CCBS facility for the second subscriber station is stopped in steps S27', S26' after a CCBS RUF acknowledgment message has been transferred in step S25' (CCBS recall unified function).

Thereafter, in step S28, the monitoring process by the operation state monitoring means of the CCBS facility is started for the first subscriber station MS (A). Eventually in step S30' the first subscriber station becomes available again and an event report message is transferred in step S31'. Thereafter, the CCBS facility is used again in step S32' to start the monitoring process in steps S33', S34' again for the second subscriber station since it cannot be guaranteed that the second subscriber station is idle at exactly the same time when the first subscriber station becomes idle again in step S30'. In step S27' the stop monitoring message is sent if there are only suspended requests in the waiting queue in case the CCBS facility handles several call set-up requests from several calling first subscriber stations at the same time. The start monitoring message in step S33' is sent if the MSC (B) is not monitoring the called subscriber station (B) at the time when the calling first subscriber station MS (A) becomes idle.

SUMMARY OF THE INVENTION

As is seen from FIGS. 7a, 7b, the first subscriber station may activate a CCBS function within the network NET which partly reduces the problem of repeated call set-up requests occupying resources of the exchange means within the telecommunication network NET. That is, when a speech or data call is to be set up between the subscriber stations, the first subscriber station can wait until the CCBS recall message indicates that the second subscriber station has become available again. However, this procedure does not remedy the problem that a repeated re-dial—which despite the activation of the CCBS function may be issued by the first subscriber station—will once again occupy resources in the telecommunication network.

Furthermore, the first subscriber station might ignore the possibility to use CCBS (which is most probably be charged for) and go on to use the re-dial functionality (which may not be charged and may only be limited by the number of available re-dials). Therefore, the problem with the re-dialings occupying resources in the network still inherently exist even for the speech call despite the provision of the CCBS function.

Considering that first of all the CCBS function would be standardized for the speech calls issued from the mobile equipment MT, this means that the re-dial functionality and the CCBS function will not immediately be available for handling the important data calls as was described with respect to the subscriber station SS3 in FIG. 6. That is, regarding the recall function and the CCBS activation function ③, ② in FIGS. 7a, 7b, it is expected that all data applications/fax applications have to be upgraded as soon as the standard has been established. This, in addition to the delayed standardization progress, contradicts an easy and fast introduction of the CCBS service in the field of data/fax services. For example, so far no attempt is known to upgrade the commands "AT-transfer" and "AT-dial" (of the AT command set as was explained above with reference to FIG. 6) on the modem-fax interface between the connected terminal equipment (computer) and the mobile termination MT. That is, the ETSI standardization has in principle only agreed how to specify the recall handling for speech calls, but has as yet not really started to work on fax and data services.

Thus, independent of the fact, whether the call set-up request relates to a speech call or a data call, the occupying of resources within the telecommunication network NET, in particular within the radio interface(s) AI and the radio access network BSS of the telecommunication system by repetitive call set-up requests for the same call still presents a problem.

Therefore, the object of the present invention is to provide a control apparatus, a control method, a telecommunication system as well as a subscriber station, which allow an optimal use of the resources of the telecommunication network when setting up calls between subscriber stations.

SOLUTION OF THE OBJECT

This object is solved by a control apparatus as defined in claims 1, 22. Furthermore, the object is solved by a control method as defined in claim 23 and claim 39. Furthermore, the object is solved by a telecommunication system as defined in claims 40, 41, 55. The object is also solved by a subscriber station as defined in claims 56, 60, 61.

Independent as to whether the call set-up request issued by the first subscriber station relates to a desired call for which a call set-up request has been issued before—i.e. a repeated call set-up request—or is a first call set-up request for which a previous call set-up request has not been issued before, a call set-up request blocking means blocks a transfer of the call set-up request issued by the first subscriber station to the exchange means of the telecommunication network, when it is activated by an activation means in response to said second subscriber station—i.e. the called-subscriber station—being in a busy state.

Since the exchange means in the telecommunication network is not occupied by call set-up requests which would eventually fail anyway (since the second subscriber station is busy) the resources, in particular in the BSS and the AI, are optimally used and are free for call set-up requests issued from other first subscriber stations to other second subscriber stations of the telecommunication system (or free for "other types of calls" of said first subscriber station e.g. to another second subscriber station).

The use of the call set-up request blocking means and the activation means is particularly advantageous if the handled call set-up request relates to a repeated call set-up request for example issued by an automatic recall means of the first subscriber station. A recall detection means will detect whether the call set-up request is a call set-up request issued by the automatic recall means of the first subscriber station. Preferably, in such a case, the control apparatus only blocks the user applications repeated re-dialings (repeated call set-up requests) as long as the CCBS service is activated and a remote user-free indication has not been received from the network. That is, there is not even a necessity that the full CCBS service is employed. It is only necessary that in view of the fact that some part of the CCBS service is employed which has a simple notification mechanism which informs the first subscriber station that the second subscriber station previously being busy has become idle. That is, only the operation state monitoring means must be provided in the telecommunication network since the call completion must not necessarily be performed through the CCBS recall and set-up function as explained above.

Preferably the first subscriber station comprises a telephone equipment and a terminal equipment connected thereto, wherein said call set-up request is issued by said telephone equipment triggered by said terminal equipment in order to set-up a data call between said terminal equipment and said second subscriber station. The inventive control apparatus can be arranged in the terminal equipment or in said telephone equipment. That is, by locating the inventive control apparatus anywhere (but not within the application) the applications themselfes and the interface to the application do not need to be updated. Thus, advantageously the terminal equipment, for example a computer, does not need to be updated once the standardization for the CCBS supplementary service for GSM has been finalized.

Preferably the activation means activates the call set-up request blocking means and the operation state monitoring means of the telecommunication network if the call set-up request issued by said first subscriber station is rejected by the telecommunication network, i.e. by its exchange means.

The activation of the call set-up request blocking means can be performed with the receipt of the first call set-up request or after a predetermined number of repetitive call set-up requests relating to the same call have been issued by the automatic recall means of the first subscriber station and have been rejected by the exchange means of the telecommunication network.

What is meant with "call set-up request" is e.g. the request coming from an application such as a dial (see FIG. 4) if e.g. the inventive control apparatus is located between the application and the MS core.

When the first subscriber station comprises an automatic recall means for repeating a call set-up request to the second subscriber station, the recall detection means can preferably detect that a call set-up request is a repeated call set-up request relating to the same call by comparing a set of call parameters contained in the call set-up request with sets of call parameters stored in a call parameter memory which stores call parameters for previous call set-up requests. When the call parameters of a received call set-up request and an entry in the call parameter memory match, it can be detected that the newly received call set-up request relates to a call for which a call set-up request has already previously been issued.

Furthermore, the recall detection means can preferably detect a time interval between successive call set-up requests issued by said first subscriber station to said second subscriber station and can detect that a call set-up request has been issued by said automatic recall means of said first subscriber station, if the detected time interval is within a predetermined time interval.

The time interval detection can be used together with the call parameter comparison, for example the control apparatus can be trained (e.g. by observation) in order to learn when an application uses the re-dial function by the automatic recall means. For example, if always a similar time interval is used to reach a certain destination with identical call parameters stored in the call parameter memory, then the control apparatus is trained to accept in the future such a time interval as an indicator for identifying recall occurrences, i.e. that a received call set-up request relates to a call for which a call set-up request has already been issued previously.

Once the recall detection means detects that a call set-up request is a repeated call set-up request (i.e. a re-dial) the activation means will activate the call set-up blocking means (such that the call is not transferred to the exchange means of the network) and a busy state indication can be sent back to the first subscriber station when the second subscriber station is in a busy state (i.e. cannot accept a call set-up).

Preferably, a delay means can be provided for delaying the activation of the call set-up request blocking means by the activation means and for delaying the sending of a busy state indication to the first subscriber station for a predetermined delay time interval. The advantage is that when the response "busy state indication" is sent back to the calling application (or the first subscriber station if the control means is located in the network) as late as possible, the first subscriber station's call set-up request can be queued for some time in order to be available for a possibly arriving idle state indication of said second subscriber station from the network. According to another embodiment the delay means can also only delay the sending back of the busy state indication to the calling first subscriber station whilst the blocking is performed nonetheless.

Further advantageous embodiments and improvements of the invention can be taken from the dependent claims. Hereinafter, the invention will explained by reference to its embodiments in conjunction with the attached drawings.

BRIEF DESCRIPTION OF THE DRAWINGS

In the drawings, the same or similar reference numerals designate the same or similar parts everywhere. In the drawings.

FIRST EMBODIMENT (CALL SET-UP REQUEST BLOCKING)

Figure 1:
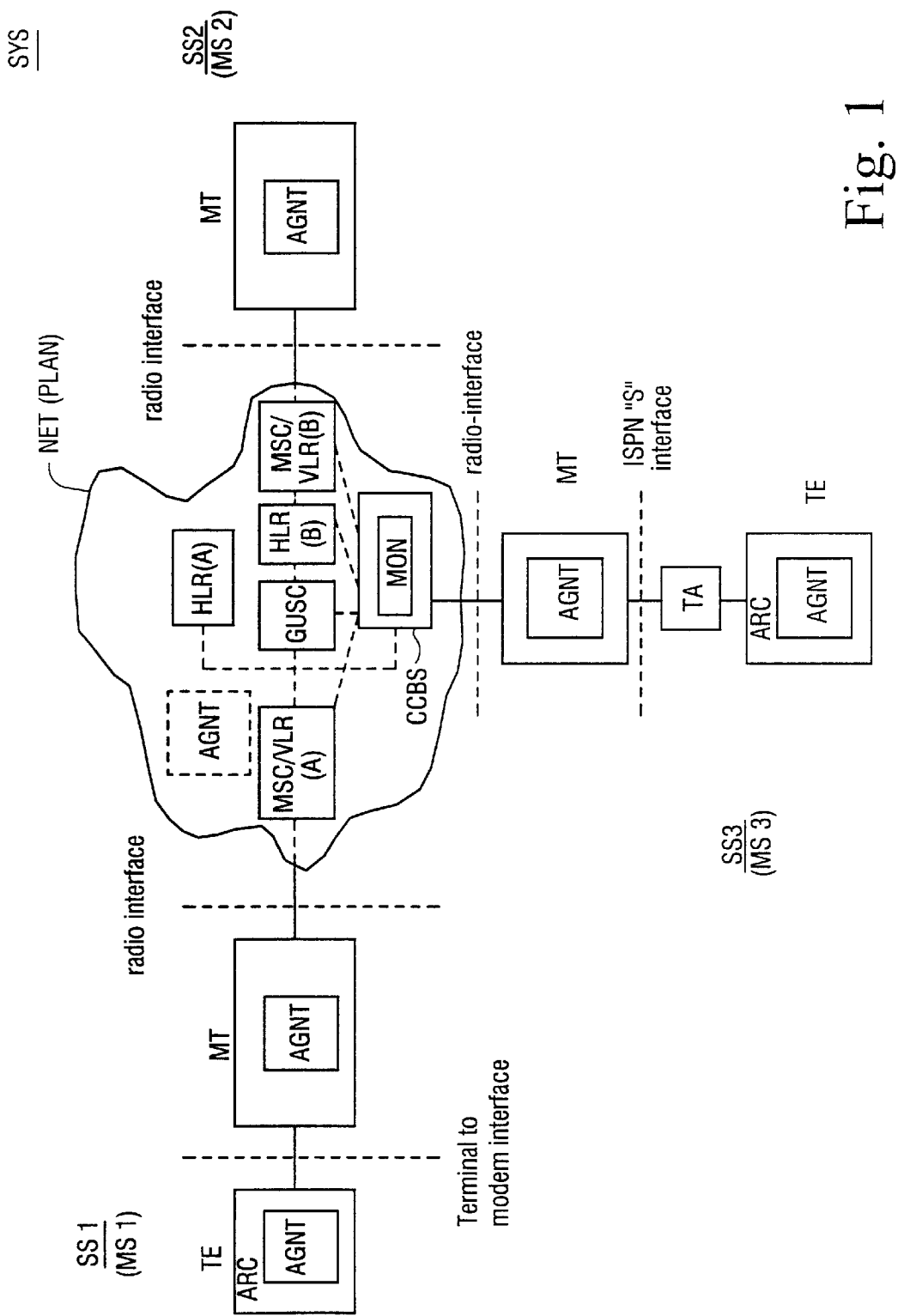
FIG. 1 shows an overview of the inventive telecommunication system SYS including a network NET and a number of subscriber stations SS1, SS2, SS3 and the possible location of the inventive control apparatus AGNT.

FIG. 1 shows an overview of the telecommunication system SYS according to the invention including at least a first and a second subscriber station SS1, SS2 connected to a telecommunication network NET having an exchange means GMSC, MSC/VLR (A), MSC/VLR (B), HLR (A), HLR (B) for setting up calls between the first subscriber station and the second subscriber station.

Preferably the subscriber station SS1, SS2 each comprises a terminal equipment TE connected to a mobile termination MT via a terminal to modem interface. The mobile termination MT is connected to the telecommunication network NET (preferably a public land mobile communication network PLMN) via the radio interface.

The second subscriber station SS2 is preferably a mobile termination MT with integrated speech application. Preferably the subscriber station SS3 comprises a terminal adapter TA between the terminal equipment TE and the mobile termination MT, for example an ISDN "S" interface. However it may be noted that each subscriber station (mobile station) may have according to its operation needs any configuration of mobile termination, terminal equipment and terminal adapter as is generally shown in the GSM 04.02 recommendation discussed above.

Figure 6:
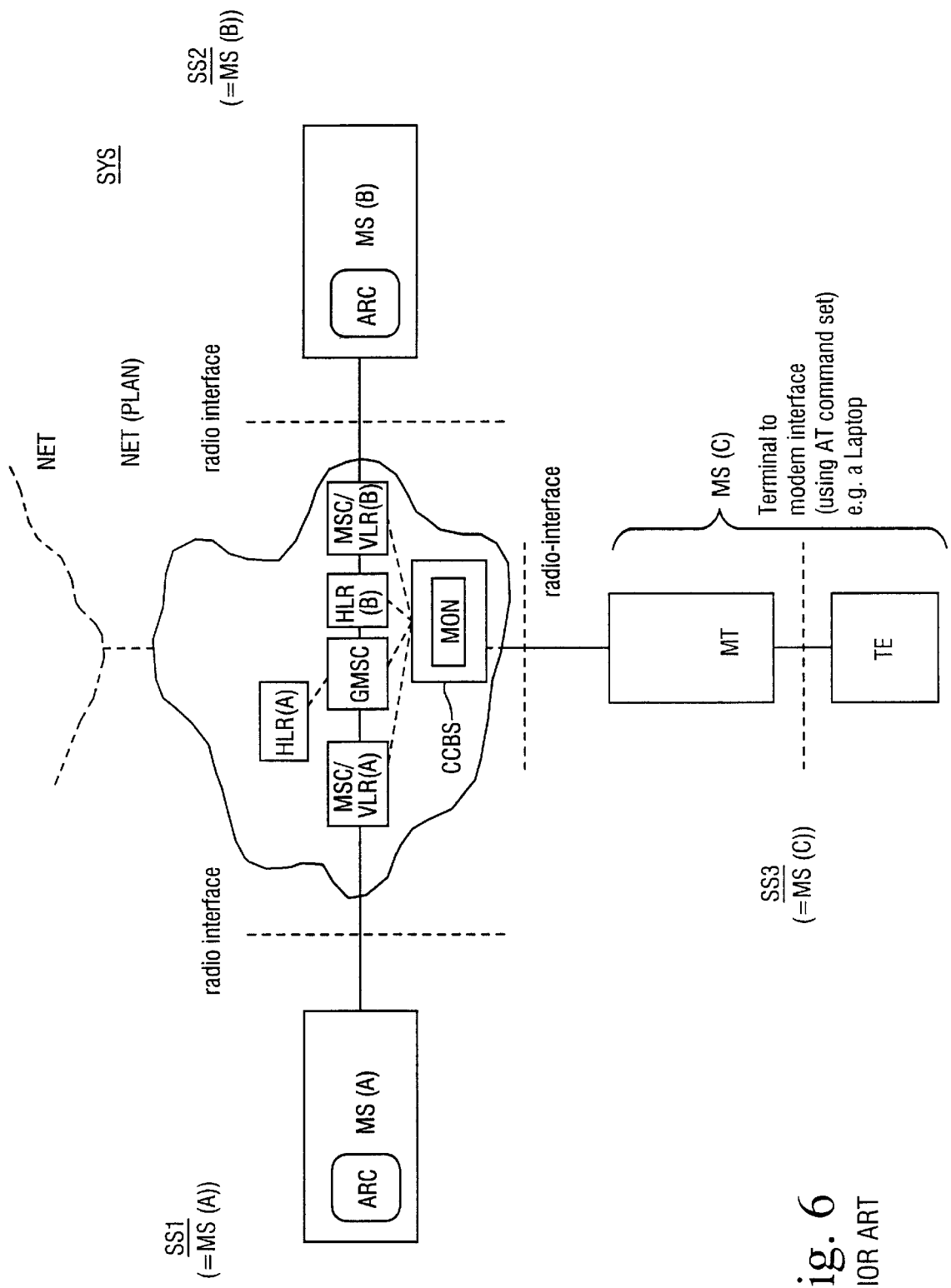
FIG. 6 shows an overview of a conventional telecommunication system SYS with two mobile stations MS (A), MS (B) and a terminal equipment TE connected to a further mobile station MS (C)

Like FIG. 6, FIG. 1 shows an example of mobile stations connected to a mobile radio communication network. However, it should be understood that the teaching of the invention is generally applicable to a telecommunication system where the communication network NET is formed by one or more PLMN and/or PSTN networks and where each of the subscriber station SS1, SS2, SS3 is either a mobile station or a conventional telephone equipment. The mobile stations MS1, MS2, MS3 may thus be replaced by conventional telephone equipment. Furthermore it should be noted that the terminal equipments TE are only optionally provided in case the invention is specifically used for the setting up of data calls to/from mobile stations needing a terminal equipment for data calls.

However, the configuration of the mobile termination also apply to the case where data applications are actually integrated in the "handy" such that data calls can also be issued directly from the mobile without needing a terminal equipment for this type of call. Thus, the invention is generally applicable to the setting up of speech calls between subscriber stations with a general telephone equipment with no need of using additional terminal equipment as is specifically used in FIG. 1.

The telecommunication system SYS can further preferably comprise an operation state monitoring means CCBS, MON monitoring the operation state of the calling subscriber station and/or the called subscriber station during the handling of a call set-up request. The operation state monitoring means may be part of a conventional CCBS (Completion Of Calls To Busy Subscriber) service implemented in the telecommunication network NET. Essentially, the operation state monitoring means provides a simple notification mechanism which informs the calling subscriber station (or called subscriber station) that a subscriber station previously being busy has become idle again. The operation state monitoring means (or the CCBS service) need not necessarily be located in the telecommunication network NET and it may be arranged elsewhere, e.g., also in one of the subscriber stations of the telecommunication system. Hereinafter the CCBS service is assumed to be implemented by the network NET for easier reference.

The major difference between FIG. 6 and FIG. 1 is the provision of a control apparatus AGNT (also called a CCBS agent hereinafter). Generally, the control apparatus AGNT may be arranged within the subscriber station itself or within the telecommunication network NET serving all subscriber stations simultaneously.

In FIG. 1 each subscriber station (e.g. a first subscriber station SS1) may send a call set-up request to the exchange means of the telecommunication network NET to make a call to another subscriber station (e.g. a second subscriber station SS2). The subscriber station issuing the call set-up request is referred to as calling or first subscriber station and the subscriber station to which the call is to be set-up is referred to as called or second subscriber station.

The control apparatus AGNT according to the invention comprises a call set-up request blocking means (not shown in FIG. 1) and an activation means (also not shown in FIG. 1). When a first subscriber station issues a call set-up request to set-up a call to a second subscriber station, a determining means of the control apparatus (not shown in FIG. 1) determines whether or not the called second subscriber station is in a busy state. That is, the control apparatus AGNT acts as an intermediator between the subscriber station's core functionality and the exchange means of the telecommunication network NET. Specifically, the control apparatus receives the call set-up request and determines whether the specifically called second subscriber station is in a busy state.

There are two possibilities for performing this determination. For example, when the call set-up request has been transferred to the exchange means of the telecommunication network and was rejected due to the second subscriber station being in a busy state, then a dial-failure or rejection message is transferred back to the calling subscriber station (namely the control apparatus serving this subscriber station) and the determining means determines the busy state of the second subscriber station on the basis of this transferred message.

Another possibility is the direct use of the operation state monitoring means CCBS, MON of the CCBS service if it has been activated beforehand or if it is continuously running in the telecommunication network. If the operation state monitoring means transfers back a busy state indication to the first subscriber station, then likewise the determining means of the control apparatus can determine that the called second subscriber station is in a busy state. The core idea of the invention is that an activation means activates a call set-up request blocking means when the second subscriber station is in a busy state. The call set-up request blocking means blocks or intercepts call set-up requests issued by the first subscriber station and prevents a transfer of such call set-up requests to the exchange means of the telecommunication network. When the blocking means is activated by the activation means in response to the determining means determining a busy state of the second subscriber station, no call set-up request can occupy any resources of the exchange means and thus the resources of the exchange means are available for the transfer of other call set-up requests to called subscriber stations which are not busy and available for a call set-up.

Therefore, the central idea is that the control apparatus AGNT shall block a call set-up request by a first subscriber station to set up the call as long as a remote subscriber station free indication has not been received from the network NET.

This generally applies independently as to whether the data call or a speech call is to be set-up between the subscriber stations. Furthermore, it should be understood that there is no necessity to have the CCBS service fully implemented, because it is sufficient to have provided somewhere a determining means that determines the operation state of the called subscriber station at the time when the call set-up request is received by the control apparatus. Comparing the functionalities of the CCBS service (i.e. the CCBS activation function, the CCBS recall function) with the functionality of the control apparatus (the CCBS agent) it should be noted that the CCBS agent is not an exact implementation of the full CCBS service on the side of the calling subscriber station. Instead, it is a simple proprietary functionality within the subscriber station side which fulfills some of the goals of the CCBS service before the actual call set-up request occupies resources in the exchange means (since the CCBS agent intercepts the call set-up request during a busy state of the called second subscriber station). Thus, the CCBS agent saves radio and network resources as long as the called second subscriber station is busy.

Preferably the control apparatus comprises a call handling means for deactivating the call set-up request blocking means when said second subscriber station changes from the busy state to an idle state. This change of operation state can be determined by the determining means or the operation state monitoring means as explained before. Thus, the call handling means (not shown in FIG. 1) can perform an automatic call set-up when the second subscriber station has become idle. Two possibilities are again available how this call set-up may be performed.

One possibilty is that the first subscriber station has only issued a call set-up request once, wherein the call handling means will use this call set-up request (i.e. its call parameters) to set-up the call as soon as the second subscriber station becomes idle. In this case the call set-up request blocking means has queued the call set-up request issued by the first subscriber station at the beginning and uses this call set up request for the eventual set-up of the call after the second subscriber station becomes available.

Another possibility is that the first subscriber station preferably comprises an automatic recall means which repeatedly (e.g. periodically) re-issues the original call set-up request. In this case the call handling means only has to wait for a renewed call set-up request to set-up the call after the second subscriber station becomes available. This will be explained in more detail with reference to FIG. 4 and FIG. 5 below.

It should however be noted here, that the special technical effect of the invention, namely that the resources of the exchange means of the telecommunication network are only used when a call can actually be set-up to the called second subscriber station, is readily achieved by the provision of the control apparatus blocking any call set-up request (be it a repeated call set-up request or an original first call set-up request) as long as the second called subscriber station is in a busy state.

Furthermore, it should be noted that this basic functionality of the control apparatus (the CCBS agent) is applicable both to the handling of data call set-up requests and speech call set-up requests. When the subscriber station comprises a telephone equipment (such as a mobile termination MT) and a terminal equipment (such as a computer), FIG. 1 shows various possibilities for the location of the control apparatus AGNT.

The control apparatus may be located within the telephone equipment or within the terminal equipment (or even within the telecommunication network NET, but the control apparatus would lose its simplicity, e.g., advanced procedures how to handle roaming within the network for mobile stations would have to be implemented; also some of the advantages like saving radio resources would not be reached).

Essentially, the control apparatus is arranged at the interface between the telephone equipment's core functionality (the common functionality for all services like speech, data, fax) and the user application located in the terminal equipment (TE), e.g., a laptop or a personal computer. Therefore, in FIGS. 4, 5 to be discussed below, the CCBS agent is arranged between the telephone equipment (such as the mobile station core) and an "application", wherein the "application" may be the speech processing device of the mobile station or in fact the application running on the terminal equipment such as fax, electronic mail, Internet access, etc.

SECOND EMBODIMENT (RECALL SET-UP REQUEST BLOCKING)

Whilst in the first embodiment the CCBS agent is provided for blocking every call set-up request issued by the first subscriber station (i.e. by the telephone equipment or the terminal equipment of the subscriber station in response to a manual or automatic activation of a call set-up request issuing means) from being transferred to the telecommunication network (i.e. its exchange means), the second embodiment relates to the case where the calling first subscriber station comprises an automatic recall means for issuing repetitive call set-up requests relating to the same desired call completion to the same second subscriber station.

As explained before, the number of such repetitive call set-up requests may be limited by law and may be issued respectively after predetermined time intervals. Of course, using the blocking means of the invention the number of repetitions need not be restricted any longer, since once the blocking means has been activated the repetitive call set-up requests actually do not reach the exchange-of the network any longer and can thus not occupy resources therein.

Figure 2:
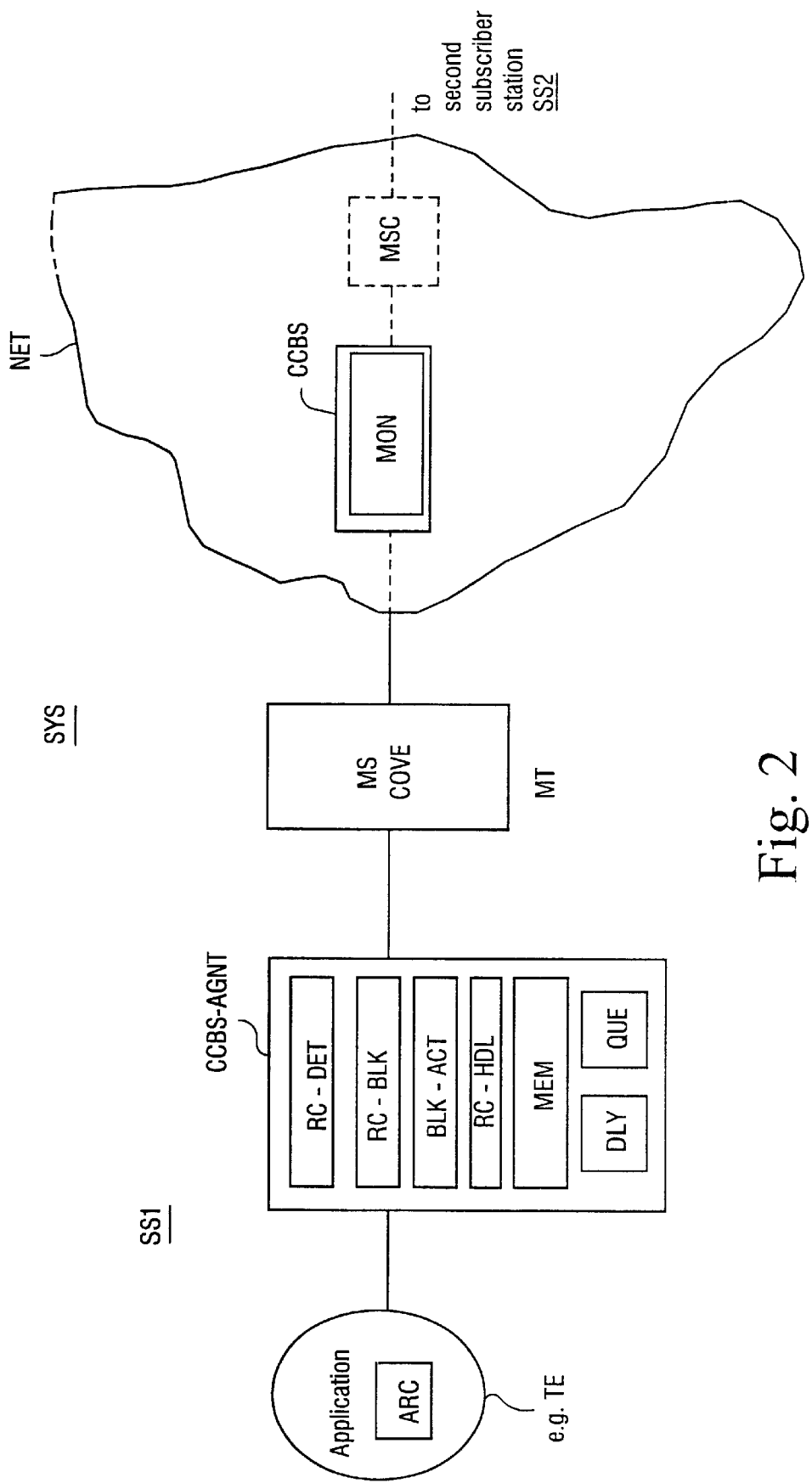
FIG. 2 shows an embodiment of the inventive control apparatus AGNT in an example for handling call set-up requests relating to a data call issued by a terminal equipment TE.

FIG. 2 shows an embodiment of the telecommunication system SYS with an embodiment of the inventive control apparatus CCBS-AGNT. Having discussed the several possibilities of locating the control apparatus within the telecommunication system, FIG. 2 shows an example where the CCBS-AGNT is located between the terminal equipment and the telephone equipment (e.g. the core of a mobile termination MT). The network NET comprises the same functionalities as in FIG. 1 which are not reproduced for simplicity. However, as generally explained above, any other location of the control apparatus within the terminal equipment or within the telephone equipment or even within the telecommunication network is possible without any loss of generality.

The control apparatus AGNT of the embodiment in FIG. 2 for handling the recalls of the first subscriber station comprises a recall detection means RC-DET, a recall blocking means RC-BLK, an activation means BLK-ACT and a recall handling means RC-HDL. Essentially the recall blocking means RC-BLK, the activation means BLK-ACT and the recall handling means RC-HDL perform similar functions as in the more general case in FIG. 1, wherein the difference is that in FIG. 2 the call set-up request to be blocked or not is a call set-up request issued by the automatic recall means ARC of the first subscriber station. The recall detection means RC-DET detects whether a call set-up request is a call set-up request issued by the automatic recall means of the first subscriber station.

Optionally the control apparatus CCBS-AGNT may comprise a call parameter memory MEM, a delay means DLY and a queuing means QUE whose functions will be explained in more detail with reference to FIGS. 5a, 5b hereinafter.

The central idea in the embodiment in FIG. 2 is that the control apparatus CCBS blocks a re-dial of the first subscriber station (issued by the automatic recall means thereof) to set-up the call as long as the remote user-free indication has not been received from the network NET. To realize this special technical effect the control apparatus comprises the recall detection means RC-DET, the recall blocking means RC-BLK, the (blocking) activation means BLK-ACT and the recall handling means RC-HDL as shown in FIG. 2. Furthermore, the telecommunication network NET comprises the CCBS service or at least the operation state monitoring means MON as explained above, whilst the first subscriber station comprises an automatic recall means and a determining means for determining whether the second subscriber station is in a busy state. The functions are as follows:

a) Re-dial Detection

When the first subscriber station (e.g. its data application running on the terminal equipment) issues the first (original) call set-up request to the second subscriber station (by a call set-up request sending means), of course this first call set-up request does not relate to a repeated call set-up request and thus the recall detection means cannot detect a re-dial. However, the first call set-up request might be rejected by the telecommunication network or might already be blocked by the call set-up request blocking means if it has been activated due to the second subscriber station being in the busy state.

In both cases the automatic recall means of the first subscriber station will repeat a call set-up request relating to the same call (i.e. the set-up of a call between-the first and second subscriber station). A maximum number of repeated call set-up requests may be predefined (e.g. 20) and furthermore the automatic recall means may issue the request periodically at a predetermined frequency or successively at respective predefined time intervals. For example, the higher the number of re-dials (repeated call set-up requests) the shorter the time interval between renewed requests can be.

Essentially the CCBS agent, more specifically its recall detection means, detects that an application on a terminal equipment repeats (will repeat) a call set-up request. The activation means decides to activate the recall blocking means for this call, preferably when a busy indication for said second subscriber station is output by an operation state monitoring means.

The recall detection means detects the repeated call set-up attempt preferably by evaluating the call parameters contained in the call set-up request message. If the call set-up request is output by the telephone equipment (e.g. a mobile termination MT) then the conventional GSM call parameters can be evaluated. If the control apparatus AGNT is located in the termination MT, then the call parameters of the AT dial command as discussed above can preferably indicate to the control apparatus the parameters of the requested call, e.g. the B-number, the data rate etc. Similar information may be provided at the internal interface in case the control apparatus AGNT is located in the terminal equipment TE.

One embodiment how the recall detection means RC-DET detects the re-dial relates to the usage of a call parameter memory MEM in which the call set-up parameters are stored which the first subscriber station (i.e. the application running on the terminal equipment or directly the telephone equipment) sends to the control apparatus. That is, whenever a call set-up request is received for the first time in the control means CCBS-AGNT from the unit in the first subscriber station that desires a call to be set-up (e.g. in FIG. 2 from the application, since the control means CCBS-AGNT is located between TE and the MS core), the call parameters are stored in the memory MEM. The control means CCBS-AGNT can detect that the call set-up is send for the time first time for example by searching the memory MEM and when no matching call parameters are found this means that the call with these call set-up parameters has not been issued before.

When thereafter another call set-up request is received from the application (or respectively from the unit in the first subscriber station desiring the call set-up), the call parameters of this new call set-up request can be compared with the call set-up parameters already stored-in the memory and if a match is found then the recall detection means determines that the new call set-up request is a repeated call set-up request, i.e. the recall detection means knows that the same destination (second subscriber station) shall be reached with the same call and the same bearer capabilities (the bearer capabilities are some of the call parameters contained in a GSM call set-up request).

Another embodiment of the recall detection means RC-DET relates to the usage of the time interval in between two successive call set-up requests received from the ARC of the application desiring a call set-up (or respectively from the unit in the first subscriber station desiring the call-setup). For example, the recall detection means can maintain information for each first subscriber station regarding the features of the automatic recall means used for performing the re-dials.

For example, this information can be a time information indicating the repetition frequency or the time intervals between successive call set-up requests issued by the automatic recall means. The recall detection means can use such time information in order to determine whether a call set-up request is a repeated call set-up request. For example, when the first or a repeated call set-up request is received from the first subscriber station a timer in the recall detection means may be started and if yet another call set-up request is received from the first subscriber station the timer is stopped and the elapsed time between the two call set-up requests from the first subscriber station is determined. This may be done repetitively for determining successive time intervals for call set-up requests received from the first subscriber station. These successive time intervals can then be evaluated by the recall detection means RC-DET.

The automatic recall means ARC of the first subscriber station can for example start a timer when a previous call set-up request has failed and when a predetermined time interval expires the ARC issues the same call-setup request again. If then the time interval between the previous call set-up request and the new call set-up request as e.g. measured by the recall detection means RC-DET is within the time interval defined in the time information, then the recall detection means RC-DET assumes that the first subscriber station is using a re-dial function, i.e. an automatic recall means.

Likewise, several successive time intervals may be evaluated in order to determine a repetition frequency and again the repetition frequency may be compared with the repetition frequency indicated by the time information and if they match the usage of the automatic recall means in the first subscriber station is determined. Thus, the recall detection means can detect re-dials by evaluating time intervals between successive call set-up requests.

Furthermore, the recall detection means can combine the call parameter comparison with the time interval evaluation. That is, when the call set-up request is sent from the first subscriber station, the call parameter comparison with call parameters stored in the memory MEM previously is performed and simultaneously the time interval evaluation is executed. Only when the call parameters match and the time interval between the previous call set-up and the new one is within the defined range (e.g. typically 30 seconds, 60 seconds), then the recall detection means assumes that the-first subscriber station uses the re-dial function.

The time information available in the recall detection means can be pre-set or can be set (trained) or updated by a subscriber station. For example, the subscriber station may send to the control apparatus information indicating the repetition frequency or respective time intervals used by the respective automatic recall means in the subscriber station.

However, the recall detection means can also by itself learn when an application or a subscriber station uses the re-dial function. For example, if always a similar time interval is used to reach a certain second subscriber station with identical call parameters, then the control apparatus is trained to accept in the future such a time interval as an indicator for identifying re-dial occurrence.

Furthermore, even without the usage of the time information the recall detection means can determine the re-dial if the comparison of the call parameters have been successful at least a predefined number of times with each receipt of a new call set-up request. For example, if three successive call parameters sets matches are determined (possibly in predefined time intervals as explained above), then the recall detection means detects the usage of an automatic re-dial.

b) Re-dial Blocking

For each call set-up started by a first subscriber station the recall detection means checks if the received call set-up request relates to a call set-up for which a previous call set-up request has already been issued. For example, as explained above, it is detected whether the received call parameters match an entry in the call parameter memory MEM (i.e. in a re-dial blocking list set-up therein). If during a repeated call set-up request the second subscriber station is busy the activation means (explained below) will activate the re-dial blocking function, i.e. it will activate the recall blocking means RC-BLK. The recall blocking means will then reject the renewed call set-up request, i.e. it will not allow a transfer of this call set-up request to the telecommunication network or to its exchange means such that resources in the telecommunication network are not unnecessarily occupied as long as the second a subscriber station is busy.

If the call set-up request has been issued by a data application from the terminal equipment TE, the recall blocking means RC-BLK answers to the application in the same way as a mobile core would do if the call attempt would have been handled by the mobile termination MT and failed. That is, the control apparatus may comprise a means for sending back to said first subscriber station (more specifically to the unit in the first subscriber station requesting such a call set-up) a busy state indication when—due to said second subscriber station being in a busy state—it rejects a transfer of a call set-up request from the first subscriber station to the exchange means (as will be further illustrated in FIGS. 4, 5a, 5b). This busy state indication can be used by the ARC to trigger the timer for the re-dial as axplained above.

The same is true if there is no terminal equipment and if the call set-up request relates to a speech call issued from the telephone equipment of the subscriber-station. Also in this case the control apparatus takes over the call set-up request blocking and the sending back of the "busy state indication" to the respective means in the telephone equipment (e.g. in the mobile station). Therefore, it should be understood that in the discussion of the following FIGS. 4, 5a, 5b the "application" may be seen as the means in the telephone equipment that issues the call set-up request generally or as the particular data application running on the terminal equipment. Likewise, the MS core in FIGS. 4, 5a, 5b can be generally the telephone equipment or a mobile termination MT itself. Therefore, all descriptions made here are equally well applicable to the handling of data calls and speech calls with reference to the specific-means provided in the terminal equipment and the telephone equipment and with respect to the location of the CCBS agent.

Since now the CCBS agent takes over the call blocking and sending back of busy signals to the respective means in the telephone equipment and/or the terminal equipment, the CCBS agent can decide on how to perform the call blocking function.

The control means CCBS-AGNT may comprise a delay means DLY (see FIG. 2) for delaying the activation of the call set-up request blocking means RC-BLK and the sending of the busy state indication to said first subscriber station in response to a receipt of a call set-up request for a predetermined delay time interval. Furthermore, the control apparatus may comprise a queuing means QUE for queuing said received call set-up request from said first subscriber station for said predetermined delay time interval. Thus, the CCBS agent's blocking (rejection of the call set-up request) can be delayed and the busy state indication may or may not be sent immediately to the first subscriber station (e.g. to the data application running on the terminal equipment). This means, that the response "busy" is sent back to the first subscriber station as late as possible and the call set-up request from the first subscriber station is queued for some time in order to be available for a possibly arriving "idle state indication" (remote user free indication) from the network with respect to the called second subscriber station.

The delay means DLY may also be provided to merely delay the sending back of the busy indication to the calling subscriber station (or application) once the call set-up request blocking means RC-BLK has been activated. Finally the delay means DLY may just delay the sending back of the busy indication without the blocking means RC-BLK having been activated.

c) Blocking Activation

The primary function of the activation means BLK-ACT is to activate said blocking function for blocking a call-set-up request from the first subscriber station if the second subscriber station is busy. Preferably, the activation means activates the recall blocking means RC-BLK when the recall detection means RC-DET detects that said call set-up request is issued as a repeated call set-up request by the automatic recall means ARC of the first subscriber station and an operation state monitoring means of the telecommunication network outputs a busy state indication for said second subscriber station. In the simplest case the busy state indication from the operation state monitoring means may just be an information that the call set-up request has been rejected by the network.

That is, according to a first embodiment of the activation means ACT, the activation means starts the blocking function whenever a call set-up is requested from the first subscriber station (e.g. from the telephone equipment or from a data/fax application on the terminal equipment) and the network rejects the call set-up request with the indication "second subscriber station in a busy state". The feature that the network somehow returns back a "second subscriber station busy indication" is the minimum function that must be provided by the network (i.e. by the operation state monitoring means thereof) in order that the activation means performs the activation of the blocking function of the blocking means.

Preferably, if the network has implemented the CCBS service, then the activation means may activate the blocking means when the network returns a "second subscriber station busy and CCBS possible" message in response to a call set-up request issued by the first subscriber station being rejected by the network.

According to another embodiment of the activation means ACT the blocking means activation is only performed, when three (or a predetermined number) successive call set-up requests relating to the same call (as detected by the recall detection means) have failed (i.e. were rejected by the network). That is, if three successive call set-up requests relating to the same call set-up to the same second subscriber station have been routed to the network and have been rejected ("busy state indication is returned") then the activation of the blocking means is performed. Preferably, the activation is only made when the previous call set-up requests were initiated within roughly specified time intervals as defined in the time information used by the recall detection means.

As long as the blocking means is activated by the activation means to block call set-up requests from the first subscriber station to a specific second subscriber station an information should preferably be maintained in a memory of the control means which indicates that call set-up requests from this particular first subscriber station to this particular second subscriber station will be presently blocked by the control apparatus. If the recall detection means detects a re-dial by a comparison of call parameters (i.e. after parameters of a first call set-up request are stored and subsequently compared with call parameters in succeeding call set-up requests) then the call parameters stored in the memory MEM can constitute this information as a "re-dial blocking list".

However, as explained above, the recall detection means may detect a re-dial merely on the basis of an evaluation of time information (successive time intervals of call set-up requests) and in this case the call parameters of the call set-up requests which will be blocked by the blocking means must at least be entered into the "re-dial blocking list", i.e. the memory MEM when finally the activation of the blocking means has been performed.

This is necessary, because the control apparatus must block further call set-up requests directed to the desired busy second subscriber station, whilst it must not block other call set-up requests that may be issued by the first subscriber station and which are directed to another second subscriber station for which the call set-up has yet not been blocked. Therefore, the easiest way to detect whether a call set-up request is one that is currently been blocked by the control apparatus is to compare the call parameters in the memory MEM (i.e. in the "re-dial blocking list").

Furthermore, if the network has been provided with the complete CCBS service and the network indicates "CCBS possible" together with the "busy indication" due to a rejection of the call set-up request for the second subscriber station by the network, the activation means BLK-ACT according to a further embodiment of the invention can activate the CCBS service. When the CCBS activation is confirmed by the network, then a copy of the call parameters, which the first subscriber station used to set-up the call with the call set-up request is then inserted in the memory MEM, i.e. in the "re-dial blocking list". Mainly the CCBS index is used such that a "human" user can associate a service activation with "remote user free" indications in order to decide to accept a CCBS recall.

In the CCBS service (as described in the GSM specifications) a CCBS index is allocated by the network for the activated service and this index may be assigned to the stored call parameter set. Essentially the CCBS index is a parameter indicating that the CCBS service is operating for the specific call set-up request issued by the first subscriber station to set up a call eventually to the second subscriber station.

Finally, according to another embodiment of the invention the call set-up blocking means can be activated by the first subscriber station itself, for example after receiving a "busy state indication" for said second subscriber station.

d) Re-call Handling

Essentially, a call handling means RC-HDL is provided for deactivating the call set-up (or recall) request blocking means RC-BLK as soon as the second subscriber station becomes available such that a call can be set-up to this subscriber station. Preferably, the call handling means deactivates the blocking means when the second subscriber station changes from said busy state to an idle state.

According to one embodiment the call handling means RC-HDL removes a call parameter set from the call parameter memory MEM (i.e. the "re-dial blocking list") when deactivating the call set-up request blocking means RC-BLK. Therefore, the next time a call set-up request is received from the first subscriber station a match of call parameters in the memory will not be detected and thus such a call set-up request will no longer be blocked by the blocking means. According to another embodiment the call handling means removes the call parameters sent from the call parameter memory MEM after a predetermined time period, i.e. in this case it is assumed that after a predetermined time period the second subscriber station will definitely be available again for a further call set-up.

Therefore, the CCBS agent can remove an entry within the "re-dial blocking list" after a predetermined time period. Furthermore, the call parameter sent may be removed if no further re-dial attempts have been detected by the recall detection means.

As soon as the blocking means is deactivated the presently pending call set-up request or the next call set-up request will then lead to a successful call set-up of the call.

If the call set-up request handling relates to a subscriber station (terminal equipment or telephone equipment) for which the CCBS service is implemented in the network, a recall procedure within the ETSI CCBS standards will be performed as soon as the second subscriber station becomes available. This recall procedure is essentially illustrated with the functions ③, ④ in FIG. 7a. In this case the network NET provides the CCBS index relating to the specific call set-up which is presently blocked by the blocking means. The CCBS index is compared with the call parameter sets in the re-dial blocking list and if a match of the CCBS index provided by the network and a CCBS index allocated to a specific call parameter set in the memory MEM is found, the call parameter set for this CCBS index is erased. Thus, further re-dial attempts arriving thereafter and being issued by the first subscriber station (i.e. a fax/data application from the terminal equipment or a speech call request by the telephone equipment) will not further be blocked by the blocking means. Therefore, as explained before, the presently pending call set-up request or the next call set-up request leads to a successful set-up of the call.

In this situation, it might happen that exactly at the time when the second subscriber station eventually becomes free for a call set-up, the first subscriber station is busy, i.e. it neither issues a repeated call set-up request nor a new set-up request to the same second subscriber station. In this situation the CCBS recall is suspended (or queued) as in the procedure ④ in FIG. 7b.

Alternatively and/or additionally of course the second subscriber station may also be provided with a control apparatus AGNT as was the case for the first subscriber station. In this case, the control apparatus of the second subscriber station can indicate a "busy state indication" for the first subscriber station at the second subscriber station which will then carry out repeated call set-up requests to the first subscriber station which may or may not be blocked by the respective blocking means incorporated in the control apparatus located in the second subscriber station.

Hereinafter, the control methods according to the invention will be further explained with reference to FIGS. 3a, 3b, FIG. 4, FIGS. 5a, 5b.

Figure 3A:
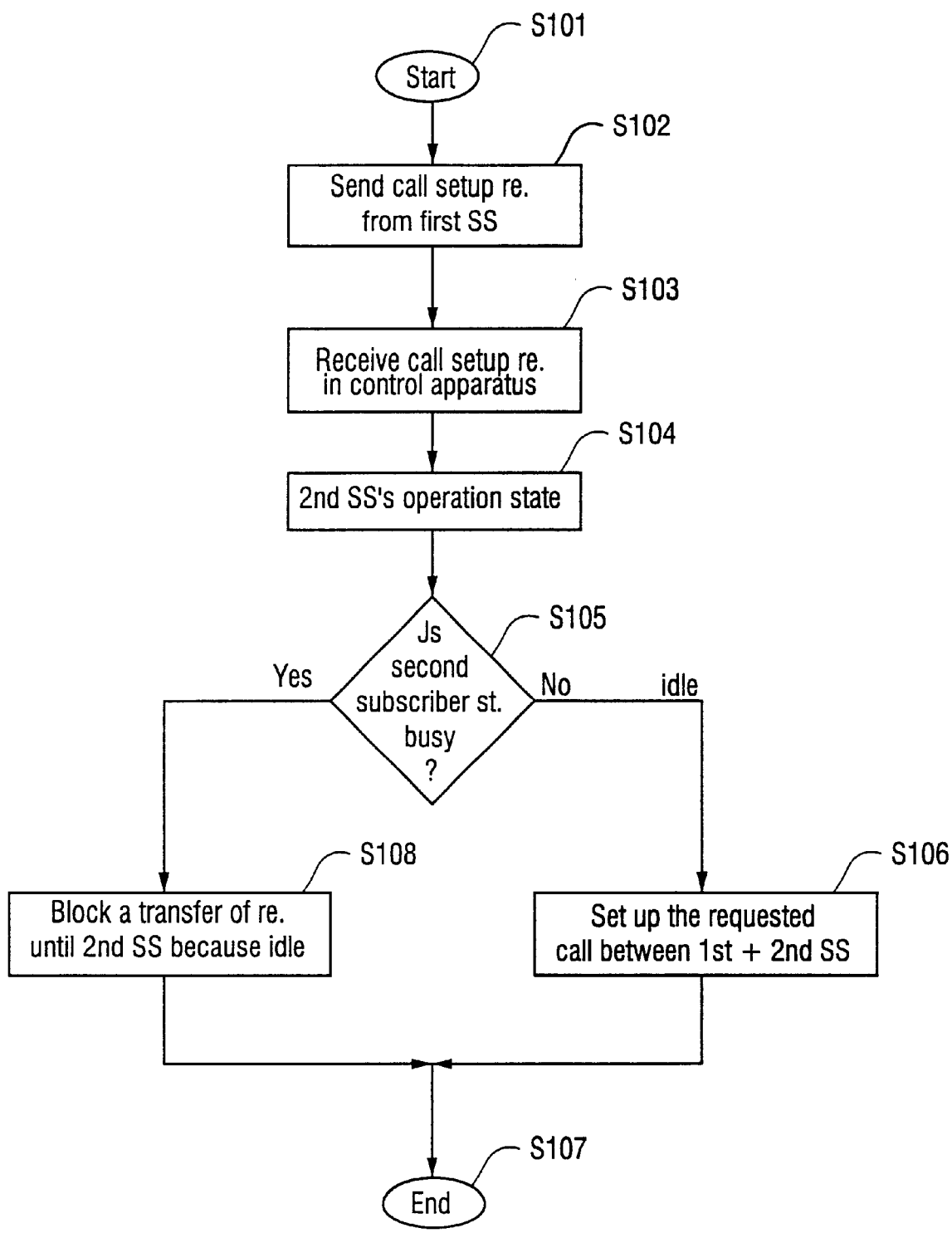
FIG. 3a shows an embodiment of the inventive control method for blocking call set-up requests from a transfer to an exchange means of the telecommunication network when the second subscriber station is busy.

The control method according to FIG. 3a employs the call set-up request blocking means and the activation means of the first embodiment with respect to the blocking of a call setup request. FIG. 3b and FIGS. 4, 5a, 5b employ the respective means explained above for the second embodiment with respect to the blocking of repeated call set-up requests (re-dials) for a situation when a CCBS service here located in the network can be activated.

THIRD EMBODIMENT (METHOD FOR CALL BLOCKING)

In FIG. 3a the first subscriber station sends a call set-up request in step S102. The call set-up request is received or intercepted in the control apparatus in step S103. In step 104 the operation state of the second subscriber station is determined, either by the mere fact that the call set-up has been rejected by the network or by the operation state monitoring means of the network. If in step S105 the second subscriber station is determined to be in a busy state, the currently pending call set-up request is blocked from a transfer until the second subscriber station changes from the busy state into the idle state in step S108. If the second subscriber station is not busy in step S105 then the requested call set-up will be performed in step S106. Since there is no possibility that a call set-up request occupies resources in the exchange means if the second subscriber station is busy the resources of the network can be used more efficiently for other call set-ups and other switchings.

FOURTH EMBODIMENT (METHOD FOR RECALL BLOCKING)

Figure 3B:
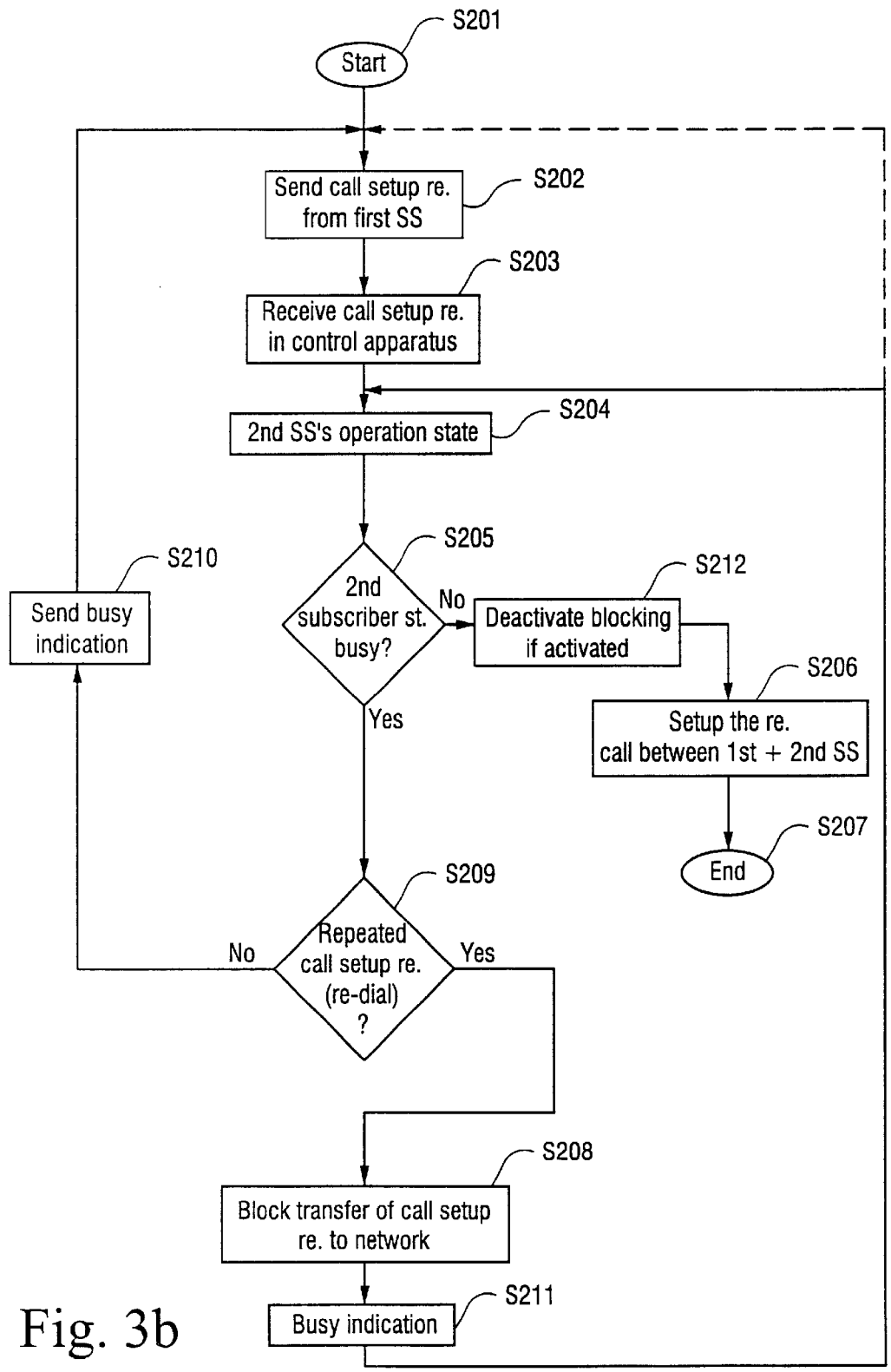
FIG. 3b shows an embodiment of the inventive control method for blocking a repeated call set-up request (a re-dial) when the first subscriber station comprises an automatic recall means and the second subscriber station is busy.

In FIG. 3b steps S202, S203, S204 and S205 correspond to steps S102, S103, S104 and S105 in FIG. 3a. If the control apparatus determines in step S205 that the second subscriber station is busy then the recall detection means RC-DET determines in step S209 whether the currently pending call set-up request is a repeated call set-up request (i.e. a re-dial). All functionalities described above for the recall detection means can be employed in step S209 (and also in step S205 for determining whether the second subscriber station is busy).

If so far no detection of a re-dial is made in step S209 ("N" in step S209) another call set-up request may be sent and received in steps S202, S203. In step S210 preferably a "busy state indication" is sent to the first subscriber station in order to indicate that the second subscriber station is busy. The repeated call set-up request in step S202 is issued from the automatic recall means or manually by a the user of the first subscriber station according to a time schedule or completely freely.

If the second subscriber station is still determined to be in a busy state in steps S204, S205 the second call set-up request (or in fact the n-th succeeding call set-up request) will finally be determined as a repeated call set-up request, for example issued by the automatic recall means of the first subscriber station in step S209. Therefore, the call set-up request blocking means is eventually activated in step S208 if "Y" in step S209. After step S208 the recall blocking means will block a transfer of any further call set-up request issued by the first subscriber station to set-up a call to the same second subscriber station.

The busy state indication for the second subscriber station may be sent to the first subscriber station in step S211. Continuously the operation state of the second subscriber station is monitored in step S204 since it is even possible that the first subscriber station continuously and repetitively issues further call set-up requests to the same second subscriber station (see the dashed line between step S211 and step S202).

Eventually the second subscriber station will change its operation state from the busy state to the idle state in step S204 and therefore the blocking is then deactivated in step S212 and the call is eventually set-up between the first and second subscriber station in step S206.

Of course, if during the first call set-up request the operation state was determined "idle" in step S204 there is no need for deactivating the blocking in step S212, since the blocking means has not been activated before.

As is seen in FIG. 3b, if several successively issued call set-up requests are rejected by the network the re-dial detection takes place and further repeated call set-up requests are blocked from occupying resources in the network until the second subscriber station becomes available for a successful call set-up. As explained with reference to FIG. 3a, if the first subscriber station happens not to be available when the second subscriber station becomes available again, the same procedure as in FIG. 3b may be carried out by a control apparatus located in the second subscriber station.

It should also be noted that the above discussed steps S205, S209 and S210 can relate to the-same-type of call of in fact to different types of calls. That is, if for example a speech call setup request is issued for the first time and the second subscriber SS2 is busy then a busy indication is sent in step S210. However, this does not exclude the possibility that in fact the request is routed to the exchange since so far no blocking has been performed. Only after repetitive requests relating to the same call, steps S209 and S208 enable the blocking.

However, the second subscriber may have several different applications (addressable with different numbers or different call setup parameters), for example speech and data applications, such that the mere indication of "busy" may not sufficiently indicate what type of application in the second subscriber is busy and which one is not. Thus, despite receiving the busy indication in step S210, the application in the first subscriber can issue another (first) call set-up request relating to a different type of call which may be successfully setup even if the previous busy indication only related to an application in the second subscriber station to which the another new call setup request does not relate.

Alternatively a modified busy indication really indicating what type of application in the second subscriber station is busy may be returned to the first subscriber in step S210 to inform the first subscriber about the type of busy application (to which presently no call can be set up), so that the first subscriber can intentionaly try a different type of call. In the control means the fact whether or not the present call setup request is a repeated one—even to different applications in the same second subscriber station can be detected by analyzing the call parameters contained in the call setup requests and/or by comparing them with the busy indication which indicates the type of application in the second sub-scirber station. If for example a parameter in the call setup request indicating the desired type of call (i.e. a particular application in the second subscriber station) does not match a parameter in the modified busy indication indicating the type of busy application in the second subscriber, then the call setup request may still be routed to the exchange means and the call may still be successfully setup, despite the issuance of a busy indication for the second subscriber station.

FIFTH EMBODIMENT (METHOD INCLUDING CCBS ACTIVATION)

Figure 4:
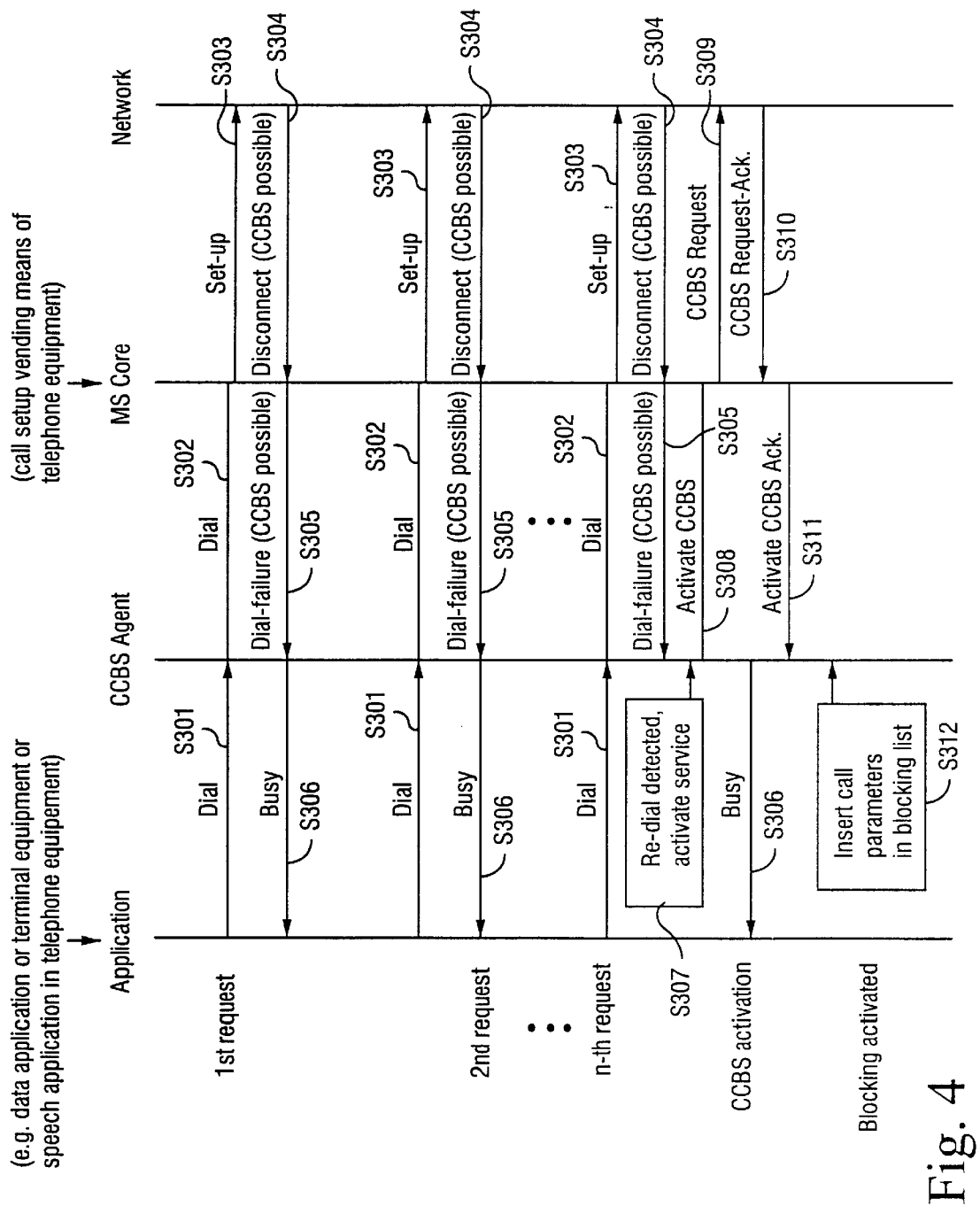
FIG. 4 shows a further embodiment of the inventive control method according to FIG. 3b.
Figure 5A:
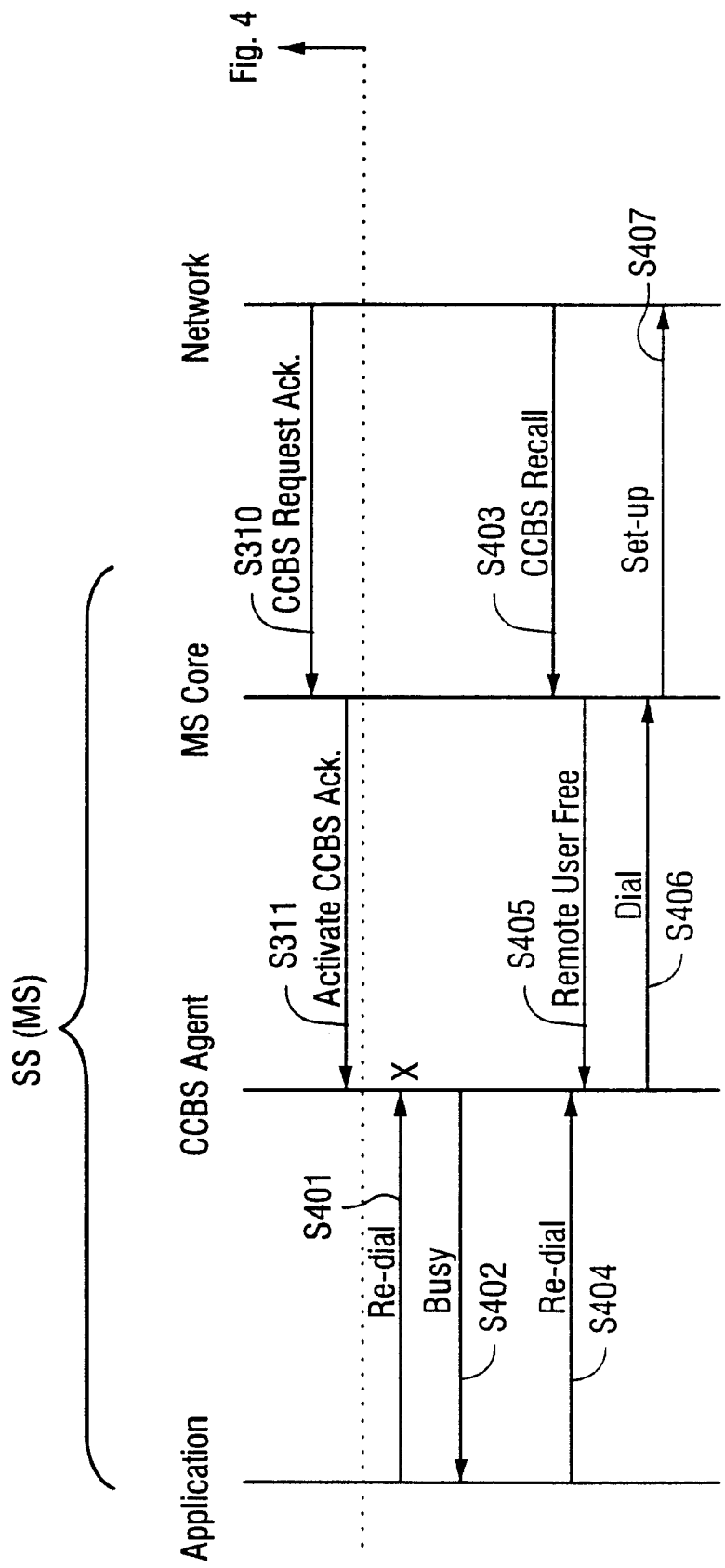
FIG. 5a shows the call handling when after activation the blocking means a recall (re-dial) attempt is available when the second subscriber station changes from a busy state to an idle state.
Figure 5B:
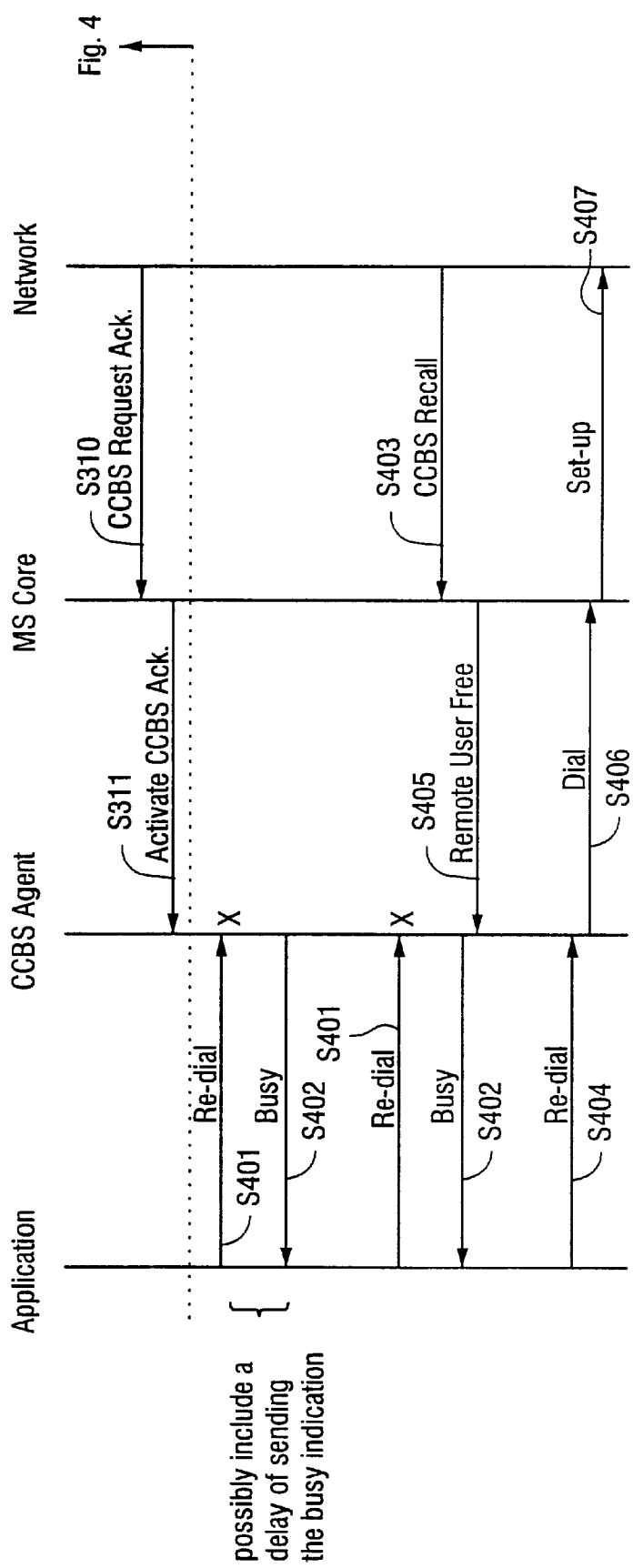
FIG. 5b shows the call handling when after activating the blocking means no call (re-dial) attempt is available when the second subscriber station changes from a busy state to an idle state.

FIGS. 4 and 5a, 5b show the control method of the invention with further details for the case that the network has implemented a CCBS service for the first subscriber station (i.e. the first subscriber station has subscribed to the CCBS service of the network, e.g., to the ETSI CCBS service in the GSM radio communication network).

Hereinafter, it is assumed that in FIGS. 4, 5a, 5b "application" means a data/fax application run by the terminal equipment (for example using the AT command set) in order to set-up a data call through the MS core to a second subscriber station connected to the network.

However, it should be understood that "application" in FIGS. 4, 5a and 5b can also be the "speech call set-up means" of a single telephone equipment, wherein "MS core" would be the part of the telephone equipment which is responsible for sending call set-up requests to the network, e.g. via the radio interface in case the network is a mobile radio communication network.

Essentially, FIG. 4 shows a flowchart up to the point where the activation means BLK-ACT activates the recall blocking means RC-BLK after several re-dials have been detected. In step S301 the application issues a call set-up request (a dial operation is carried out). The call set-up request is transferred from the CCBS agent to the MS core in step S302. In step S303 the exchange means of the network receives the call set-up request. If the second subscriber station is busy a disconnection (rejection) message is transferred back to the MS core in step S304. A dial-failure (rejection) message is provided to the CCBS agent in step S305. The message in step S305—in addition to indicating the rejection of the call set-up request—may indicate that the CCBS service of the network (if implemented) can in principle be activated (if the first subscriber station wants to do so and has a subscription to such a service). It is assumed here that the CCBS service can be activated by the first subscriber station. A busy state indication of the second subscriber station is sent to the first subscriber station (to the application on the terminal equipment or the telephone equipment) in step S306. Thus, steps S301, S302, . . . , S306 illustrate the procedure of a failed call set-up request.

As is seen with the second set of steps S301, S302, . . . , S306 the automatic recall means of the first subscriber station may repeat the call set-up request again (according to a predetermined time schedule or with a predetermined repetition frequency up to a maximum number of repeated requests).

Eventually, during the n-th request (for example after the third time) the recall detection means eventually detects that the call set-up request is a repeated call set-up request in step S307. As explained above, this can be done by comparing call parameters sets or by evaluating time intervals by the recall detection means. Since the message in step S305 has indicated that the CCBS service can be activated for the first subscriber station, the activation means does not only activate the blocking means in step S307 for blocking any further re-dials, but also activates the CCBS service in steps S308, S309, . . . , S311.

When the acknowledgment message for the activation of the CCBS service is received in step S311, i.e. at least an operation state monitoring means monitoring the operation state of the second subscriber station is activated, the call parameters are inserted in the "re-dial blocking list" Furthermore, the CCBS index may be inserted in the memory as explained before.

From step S312 onwards the automatic recall means of the first subscriber station may issue further repeated call set-up requests, which will however be blocked from a transfer at least to the network and preferably already to the MS core. Furthermore, at least an operation state monitoring means will monitor the operation state of the second subscriber station. Whilst in the current CCBS service preferably a "user busy" indication can be determined, in principle—using the next generation of mobile systems after GSM namely the UMTS system—it will also be possible to provide such indications for data calls. That is, when the call relates to a data call issued by an application from the first terminal equipment, then the operation state of an application running on the terminal equipment of the second subscriber station is monitored.

SIXTH EMBODIMENT (RE-DIAL AVAILABLE AFTER CCBS DEACTIVATION)

In FIG. 5a steps S310, S311 above the dotted line relate to FIG. 4. If the CCBS service is activated after step S311 and the blocking means is activated for blocking the call set-up request, of course any further attempt by the first subscriber station (the application) to issue a re-dial in step S401 is immediately rejected by the CCBS agent and a busy state indication is sent in step S402. As explained above, the blocking means blocks all further re-dials from being transferred to the network or the MS core.

Figure 7A:
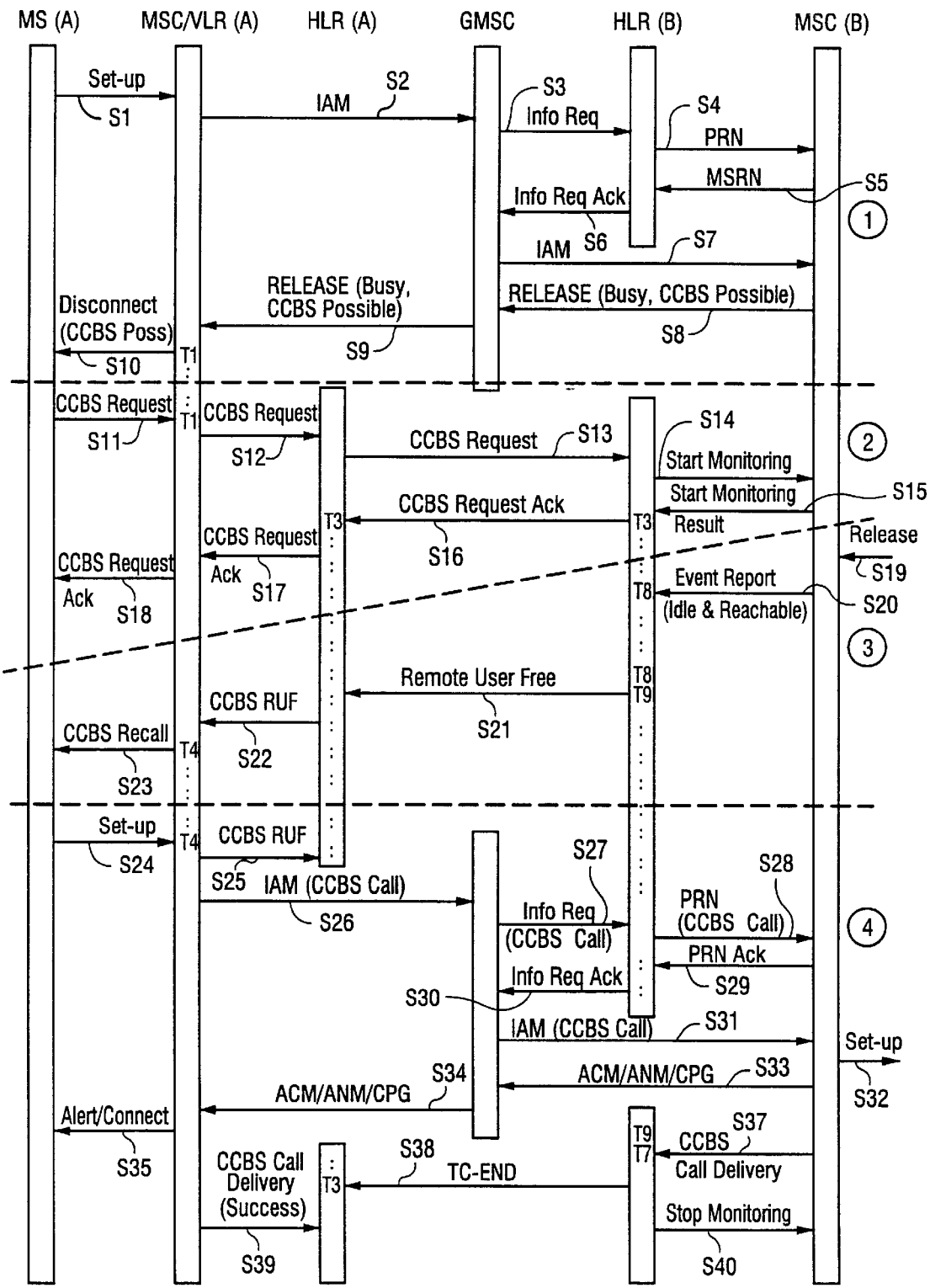
FIG. 7a shows a conventional call handling when a CCBS service is activated after a call set-up request issued by the first subscriber station MS (A) is rejected by the exchange means of the telecommunication network and the first subscriber station is idle when the second subscriber station becomes available.
Figure 7B:
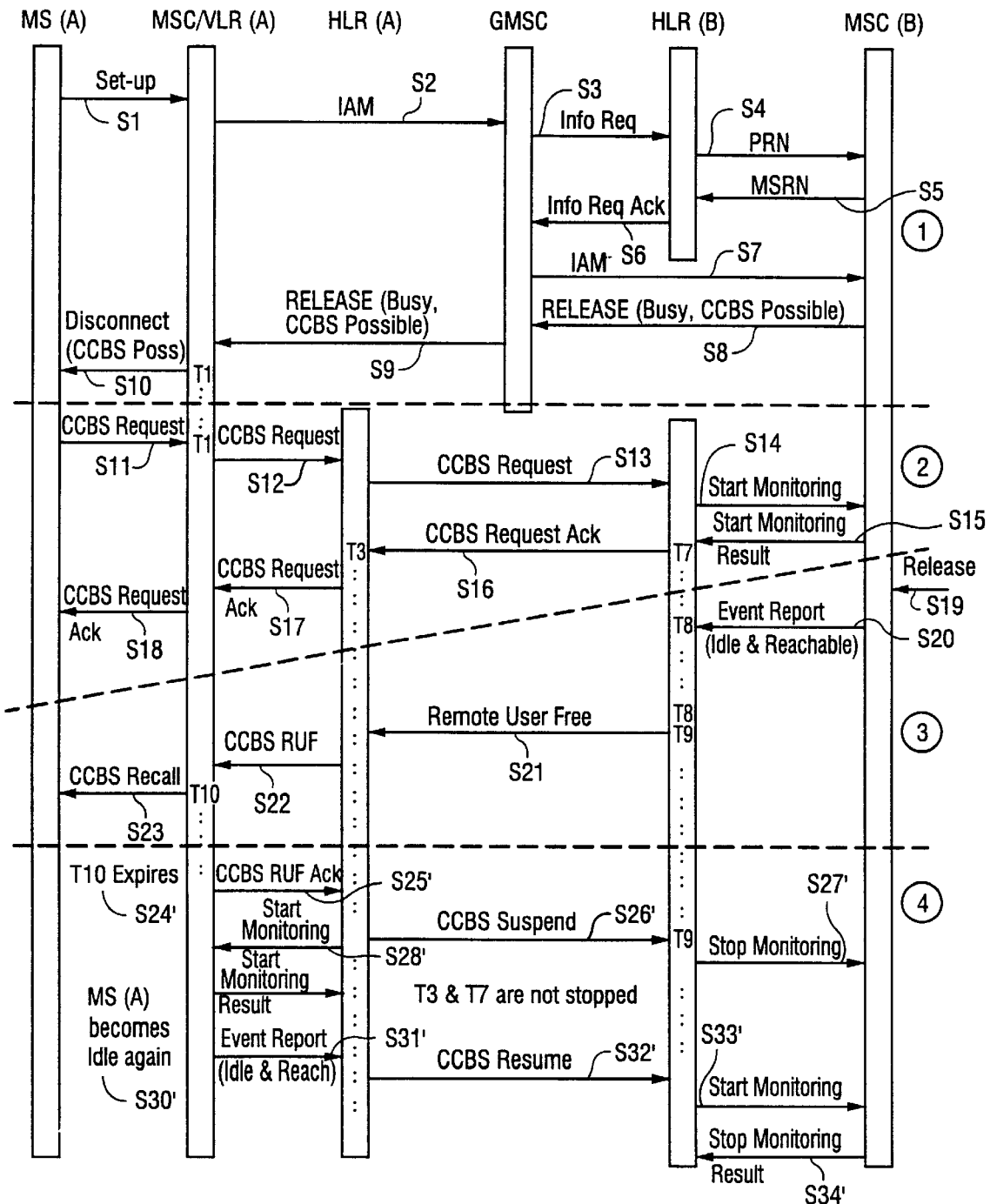
FIG. 7b shows a conventional call handling as in FIG. 7a except that the first subscriber station is unavailable when the second subscriber station after an activation of a CCBS service becomes available again.

Essentially step S403 relates to step S23 in FIG. 7a. That is, before step S403 the second subscriber station has become available again, i.e. changed from a busy state into an idle state, such that an idle state indication message is transferred to the CCBS agent in step S405 from the MS core. In this case a re-dial is available in step S404 when this idle state indication is received in step S405.

Receiving the idle state indication in step S405 the CCBS agent immediately deactivates the blocking means such that the currently pending repeated call set-up request S404 can be transferred to the network in steps S406, S407. Thus, the call between the first and second subscriber station can immediately be set-up.

The "X" in FIG. 5a designates the call set-up rejection by the blocking means. In FIG. 5a the advantage of using the delay means and queuing means explained above are apparent. If the repeated call set-up request arrives in step S404 only shortly before the remote user-free message is received in step S405, it is worthwhile to delay the sending of the busy state indication to the application and to queue the repeated call set-up request for a predetermined time interval. It can then still be used immediately for the call set-up as soon as the idle state indication message in step S405 arrives only a short period of time later than the call set-up request in step S404.

SEVENTH EMBODIMENT (NO RE-DIAL AFTER CCBS DEACTIVATION)

In FIG. 5b no repeated call set-up request (recall attempt) is available when the remote user-free indication is received in step S405. The steps S401–S407 in FIG. 5b correspond to those in FIG. 5a, with the difference that the time relationship between the messages is different.

That is, when the CCBS recall is activated in step S403 and the idle state indication is transferred to the CCBS agent in step S405 there is no call set-up request pending (not even a delayed one). Either the procedure after step S405 in FIG. 5b will be performed as in the functional procedure ④ in FIG. 7b or the CCBS recall procedure is delayed or the CCBS service is stopped at this point.

When it is delayed, then the CCBS recall will wait for the next repeated call set-up request in step S404.

When the CCBS service is stopped, this still does not prevent the first subscriber station from a successful call set-up, since the next recall attempt in step S404 will not be blocked any longer by the CCBS agent from a transfer to the network such that the call set-up request in steps S406, S407 will be successful, i.e. the call will be set-up to the second subscriber station (i.e. its fax/data application).

EIGHTH EMBODIMENT (HANDLING OF SEVERAL CALL SET-UP REQUESTS)

The description above assumes that there will only be one (possibly repeated) call set-up requested issued by one first subscriber station. This call set-up request may be sent for a data call from one application running on the terminal equipment or actually for a speech call by the telephone equipment. If the CCBS agent is located in the first subscriber station it may handle this single call set-up request. If the CCBS agent is simultaneously provided for a number of first subscriber stations (here it may preferably be located in the telecommunication network) then the CCBS agent will handle single or repetitive call set-up requests from several first subscriber stations parallely.

However, even when the CCBS agent is located in the first subscriber station, there may still be a need for handling simultaneously several call set-up requests. In particular, when a terminal equipment running several data applications simultaneously (e.g. E-mail, Internet Access, FAX) is connected to the telephone equipment. In this case, of course there may be several data call set-up requests simultaneously.

The CCBS agent according to the invention primarily performs the call set-up blocking for at least one data application. However, according to another embodiment of the control apparatus, the CCBS agent can handle several data applications parallely. On the "terminal-to-modem" interface (see FIG. 1) a multiplexing scheme is used (possibly a multiplexing scheme according to ETSI SMG4). The main extension is in the interface, whilst the CCBS agent only needs to expand its memory MEM to handle several call set-up requests from several data applications or even provide several memories separately for each data application.

The CCBS agent can also be configured, that it only operates on data applications for which a CCBS service within the network cannot be activated. For example, the CCBS agent may allow—as a default setting—all data applications to activate the CCBS service. If it then detects that the CCBS service activation fails (e.g. the respective application has no subscription to the CCBS service), it may take over the handling of call set-up requests from the data application which failed to activate the CCBS service.

Of course, the data applications may flexibly configure the CCBS agent to take over the handling of call set-up requests when either the CCBS service cannot be activated or even when it can be activated such that the CCBS agent preferably cooperates with the network internal CCBS service (as was assumed in FIGS. 4, 5a, 5b)

INDUSTRIAL APPLICATION

As explained above, according to the present invention a control apparatus is introduced, which provides a centralized functionality within a first subscriber station (e.g. a mobile termination or a terminal equipment connected thereto) or within the network to support the CCBS supplementary service of the network for data and/or speech applications. Centralized means, that the applications do not have to be upgraded for the CCBS service which is currently being standardized. Preferably, the network side has implemented the CCBS service and the supported speech or data applications on first subscriber station contain an automatic recall means (i.e. a re-dial function).

As explained, the implementation of the CCBS service for fax and data applications is thus possible without updating all the user applications to support the CCBS service. Thus, the invention is particularly advantageous for the fax and data services provided on the terminal equipment. However, it should be understood, that the invention is not restricted to the fax and data services only and can also be used for speech services for blocking a single speech call set-up request or a repeated speech call set-up request, i.e. when the user repetitively issues the same recall request or uses an automatic recall means.

The invention allows a quick implementation of the CCBS service which is currently being standardized. In case of a mobile station, it will be a proprietary solution and not all service requirements from ETSI will be met. Nevertheless this will not be visible to the network due to the interception function of the CCBS agent. Due to the limited time in the network giving the mobile station time to react on the "remote user-free indications" via the delay means and queuing means, the network may see a behavior which looks like "no reaction from the user". This is a minor disadvantage, because instead of an automatic completion from the CCBS service, the call will most probably only be completed by the next recall as explained in FIG. 5b.

However, the invention solves the problem caused by applications/users which misuse the re-dial functionality. Most importantly, it saves radio resources and signalling resources in the network as long as the destination cannot be reached. This is seen as a major advantage for network operators, since the resources of the network are completely free to handle other call set-up requests. Furthermore, since the CCBS service will obviously be charged for by the network operators, the subscriber stations have the advantage of cost savings.

It should also be understood that the terms "subscriber station", "mobile station", "mobile termination", "terminal equipment" and "telephone equipment" are only used to be able to distinguish where the particular unit or application may be located that issues the particular call setup request. Is it thus clear that the control means (the CCBS agent) may be located either in the network or in the terminal equipment or in the mobile termination depending on where the requesting application is located. Thus if sometimes the broad term "subscriber station" is used, of course this means the particular application within the subscriber station which performs the call setup requests.

It should be noted that in the-light of the above teachings various variations and modifications will be obvious to a skilled person. Therefore, the invention is not limited to the above-described embodiments and the scope of the invention is only defined by the attached claims. Furthermore the invention can in particular comprise features which are a combination of respective single features of the claims.

Reference numerals in these claims only serve clarification purposes and do not limit the scope of the invention.

What is claimed is:

1. A control apparatus (AGNT) for controlling the set-up of calls between a first subscriber station (TE, MT, SS1) and a second subscriber station (TE, MT, SS2) which are connected to a telecommunication network (NET), comprising:

a) a recall detection means (RC-DET) for checking if a received call set-up request relates to a call set-up for which a previous call set-up request has already been issued by said first subscriber station (TE, MS1, SS1);

b) a call set-up request blocking means (RC-BLK) for blocking said received call set-up request issued by the first subscriber station (TE, MS1, SS1) to set up a call to the second subscriber station (TE, MS2, SS2) from being transferred to the exchange means (GMSC, MSC/VLR, HLR) of the telecommunication network (NET); and c) an activation means (BLK-ACT) for activating said call set-up request blocking means (RC-BLK) when said second subscriber station (TE, MS2, SS2) is in a busy state.

2. A control apparatus (AGNT) according to claim 1, comprising a call handling means (RC-HDL) for deactivating said call set-up request blocking means (RC-BLK) when the second subscriber station (TE, MS2, SS2) changes from said busy state to an idle state.

3. A control apparatus (AGNT) according to claim 2, wherein said call handling means (RC-HDL) deactivates said call set-up request blocking means (RC-BLK) when an output from said operation state monitoring means (MON, CCBS) changes a busy state indication for the called second subscriber station (TE, MT, SS2) to an idle state indication.

4. A control apparatus (AGNT) according to claim 1, wherein the telecommunication network (NET) includes an operation state monitoring means (CCBS) monitoring the operation state of the second subscriber station (TE, MT, SS2), said operation state monitoring means (CCBS) outputting a busy state indication to said activation means (BLK-AC) when the second subscriber station (TE, MS1, SS1) is in said busy state.

5. A control apparatus (AGNT) according to claim 4, wherein said activation means (BLK-ACT) activates said call set-up request blocking means (RC-BLK) and said operation state monitoring means (CCBS) if a call set-up request issued by the first subscriber station (TE, MT, SS1) is rejected by the telecommunication network (NET).

6. A control apparatus (AGNT) according to claim 1, wherein the first subscriber station (TE, MT, SS1) comprises an automatic recall means (ARC) for repeating a call set-up request to the second subscriber station (TE, MT, SS2).

7. A control apparatus (AGNT) according to claim 6, wherein said call set-up request blocking means (RC-BLK) is provided for blocking a call set-up request when said recall detection means (RC-DET) detects that said call set-up request is a repeated call set-up request issued by said automatic recall means (ARC); and said operation state monitoring means (CCBS) outputs a busy state indication for the second subscriber station (TE, MT, SS2).

8. A control apparatus (AGNT) according to claim 6, wherein said activation means (BLK-ACT) performs said activation only if said recall detection means (RC-DET) detects that a predetermined number of repetitive call set-up requests relating to the same call have been issued by said automatic recall means (ARC) and have been rejected by the telecommunication network (NET).

9. A control apparatus (AGNT) according to claim 6, wherein said recall detection means (RC-DET) detects a time interval ($\Delta T$) between successive call set-up requests issued by the first subscriber station (TE, MS1, SS1) and detects that a call setup request has been issued by said automatic recall means (ARC) of the first subscriber if the time interval (ΔT) is within a predetermined time interval (30 s, 60 s).

10. A control apparatus (AGNT) according to claim 6, wherein said recall detection means (RC-DET) is provided for comparing a set of call parameters contained in a call set-up request with sets of call parameters stored in a call parameter memory (MEM) storing call parameters for previous call set-up requests and for detecting that a call set-up request has been issued by said first subscriber station (TE, MS1, SS1) repeatedly to the same second subscriber station (TE, MS2, SS2) if the call parameters match.

11. A control apparatus (AGNT) according to claim 10, wherein a call handling means (RC-HDL) for deactivating said call set-up request blocking means (RC-BLK) when the second subscriber station (TE, MS2, SS2) changes from said busy state to an idle state; and said call handling means (RC-HDL) removes a call parameter set from said call parameter memory (MEM) when deactivating said call set-up request blocking means (RC-BLK) or after a predetermined time period.

12. A control apparatus according to claim 10, wherein said recall detection means (RC-DET) detects a time interval (ΔT) between successive call set-up requests issued by the first subscriber station (TE, MS1, SS1) and detects that a call set-up request has been issued by said automatic recall means (ARC) of the first subscriber if the time interval (ΔT) is within a predetermined time interval (30 s, 60 s).

13. A control apparatus (AGNT) according to claim 1, wherein said call set-up request issued by the first subscriber station (TE, MS1, SS1) is a speech call set-up request to set up a speech call between the first and second subscriber station (TE, MT, SS1; TE, MT, SS2).

14. A control apparatus (AGNT) according to claim 1, wherein the first subscriber station (TE, MT, SS1) comprises a telephone equipment (MT, SS1) and a terminal equipment (TE) connected thereto, wherein said call set-up request is issued by said terminal equipment (TE) in order to set-up a data call between said terminal equipment (TE) and said second subscriber station (TE, MT, SS2).

15. A control apparatus (AGNT) according to claim 14, wherein the control apparatus (AGNT) is arranged in said terminal equipment (TE) or in said telephone equipment (MT).

16. A control apparatus (AGNT) according to claim 14, wherein said telephone equipment (MT) is a mobile termination (MT) and the telecommunication network (NET) comprises one or more networks selected from the group of networks comprising a public land mobile radio network (PLMN) and a public switched telephone network (PSTN).

17. A control apparatus (AGNT) according to claim 1, wherein at least one of the first and second subscriber stations (TE, MT, SS1; TE, MT, SS2) is a mobile station (MS1, MS2) of a public land mobile radio communication network (PLMN).

18. A control apparatus (AGNT) according to claim 1, wherein the first subscriber station (TE, MS1, SS1) activates said operation state monitoring means (CCBS).

19. A control apparatus (AGNT) according to claim 1, wherein said call set-up request blocking means (RC-BLK) carries out said blocking function simultaneously for call set-up requests from a plurality of first subscriber stations or a plurality of applications running on a terminal equipment thereof.

20. A control apparatus (AGNT) according to claim 1, comprising a means for sending back to the application/terminal equipment in the first subscriber station (TE, MS1, SS1) requesting the call set-up a busy state indication ("busy") when said second subscriber station (TE, MS1, SS1) is in a busy state.

21. A control apparatus (AGNT) according to claim 20, comprising a delay means (DLY) for delaying the activation of said call set-up request blocking means (RC-BLK) and/or the sending of said busy state indication to the first subscriber station (TE, MS1, SS1) in response to a receipt of a call set-up request for a predetermined delay time interval; and a queuing means (QUE) for queuing said received call set-up request received from the first subscriber station (TE, MS1, SS1) for said predetermined delay time interval.

22. A subscriber station of a telecommunication system (SYS) comprising at least one control apparatus (AGNT) according to claim 1.

23. A subscriber station according to claim 22, wherein the subscriber station comprises a terminal equipment (TE), wherein the control apparatus (AGNT) is arranged in said terminal equipment (TE).

24. A subscriber station according to claim 22, wherein the subscriber station comprises a telephone equipment (MT), wherein the control apparatus (AGNT) is arranged in said telephone equipment (TE).

25. A subscriber station according to claim 22, comprising an automatic recall means (ARC) for repeating a call set-up request to the second subscriber station (TE, MT, SS2).

26. A control apparatus (AGNT) for controlling the set-up of calls between a first subscriber station (TE, MT, SS1) and a second subscriber station (TE, MT, SS2) connected to a telecommunication network (SYS), said telecommunication network (NET) including an operation state monitoring means (CCBS) monitoring the operation state of the second subscriber station (TE, MT, SS2) and the first subscriber station (TE, MT, SS1) including an automatic recall means (ARC) for repeating a call set-up request to the second subscriber station (MT, SS2) if said operation state monitoring means (MON, CCBS) provides a busy state indication for the second subscriber station (TE, MT, SS2), comprising:

a) a recall detection means (RC-DET) for detecting whether a call set-up request is a call set-up request issued by said automatic recall means (ARC) of the first subscriber station (TE, MT, SS1);

b) a recall blocking means (RC-BLK) for blocking a call set-up request issued by said automatic recall means (ARC) of the first subscriber station (TE, MS1, SS1) to set up a call to the second subscriber station (TE, MS2, SS2) from being transferred to the exchange means (GMSC, MSC/VLR, HLR) of the telecommunication network (NET);

c) an activation means (BLK-ACT) for activating said recall blocking means (RC-BLK) for blocking call set-up requests from the first subscriber station (TE, MS1, SS1) when
said recall detection means (RC-DET) detects that said call set-up request is issued by said automatic recall means (ARC); and
said operation state monitoring means (CCBS) outputs a busy state indication for the second subscriber station (TE, MT, SS2); and d) a recall handling means (RC-HDL) for deactivating said recall blocking means (RC-BLK) when an output from said operation state monitoring means (CCBS) changes a busy state indication for the called second subscriber station (TE, MT, SS2) to an idle state indication.

27. A control method for controlling the set-up of calls between a first subscriber station (TE, MT, SS1) and a second subscriber station (TE, MT, SS2) which are connected to a telecommunication network (NET), comprising the following steps:
- a) sending (S102, S202, S301) a call set-up request from the first subscriber station (TE, MS1, SS1) towards the exchange means (GMSC, MSC/VLR, HLR) of said telecommunication network (NET) in order to request the set-up of a call to the second subscriber station (TE, MS2, SS2);
- b) receiving (S103, S203, S301) said call set-up request in a control apparatus (AGNT) provided for the first subscriber station (TE, MS1, SS1);
- c1) determining (S104, S204, S306) in said control apparatus (AGNT) whether or not said called second subscriber station (TE, MS2, SS2) is in a busy state;
- c2) checking if said received call set-up request relates to a call set-up for which a previous call set-up request has already been issued by said first subscriber station (TE, MS1, SS1); and
- d1) if the second subscriber station (TE, MS2, SS2) is determined to be in a busy state (S105, S205) and it is detected that the received call set-up request relates to a call set-up for which a previous call set-up request has already been issued by said first subscriber station (TE, MS1, SS1), then blocking (S108, S208, S312, S402) a transfer of said received call set-up request to said exchange means (GMSC, MSC/VLR, HLR); and
- d2) if the second subscriber station (TE, MS2, SS2) is determined to be in an idle state (S105, S205, S405), transferring (S106, S206) said call set-up request to said exchange means (GMSC, MSC/VLR, HLR).

28. A method according to claim 27, comprising the following further step: deactivating (S106, S212, S405) said call set-up request blocking when the second subscriber station (TE, MS2, SS2) changes from said busy state to an idle state.

29. A method according to claim 28, wherein deactivating (S106, S212, S405) said call set-up request blocking when the second subscriber station (TE, MS2, SS2) changes from said busy state to an idle state; and a call parameter set is removed from said call parameter memory (MEM) when said blocking deactivating is performed or after a predetermined time period.

30. A method according to claim 27, wherein the first subscriber station (TE, MT, SS1) repeats (S301–S306; S401, S402) the sending of a call set-up request for setting up a call to the same second subscriber station (TE, MS2, SS2) a predetermined number of times if the second subscriber station (TE, MS2, SS2) is in a busy state.

31. A method according to claim 30, wherein said blocking of a call set-up request is performed when
- it is detected (S307, S209) that said call set-up request is a repeated call setup request issued by an automatic recall means (ARC); and
- it is detected (S105, S205) that the second subscriber station (TE, MT, SS2) is in said busy state.

32. A method according to claim 30, wherein said call set-up request is transferred (S206) to said exchange means (GMSC, MSC/VLR, HLR) after the second subscriber station (TE, MS2, SS2) changes (S205) from a busy state to an idle state.

33. A method according to claim 30, wherein said blocking (S307) is started when it is detected (RC-DET) that a predetermined number of repetitive call set-up requests relating to the same call have been issued and have been rejected by said exchange means (GMSC, MSC/VLR, HLR) of said telecommunication network (NET).

34. A method according to claim 30, wherein a set of call parameters contained in a call set-up request is compared with sets of call parameters stored in a call parameter memory (MEM) storing call parameters for previous call set-up requests and it is detected that a call set-up request has been issued by the first subscriber station (TE, MS1, SS1) repeatedly to the same second subscriber station (TE, MS, SS2) if the call parameters match.

35. A method according to claim 30, wherein a time interval ($\Delta T$) between successive call set-up requests issued by the first subscriber station (TE, MS1, SS1) is determined and it is detected that a call set-up request for the same call set-up has been issued before if the time interval ($\Delta T$) is within a predetermined time interval (30 s, 60 s).

36. A method according to claim 27, wherein said call set-up request issued by the first subscriber station (TE, MS1, SS1) is a speech call set-up request to set up a speech call between the first and second subscriber station (TE, MT, SS1; TE, MT, SS2).

37. A method according to claim 27, wherein said blocking (S108, S208, S312) of said call set-up request is performed when said call set-up request issued by the first subscriber station (TE, MT, SS1) is rejected by said exchange means (GMSC, MSC/VLR, HLR) of the telecommunication network (NET).

38. A method according to claim 27, wherein the first subscriber station (TE, MS1, SS1) activates an operation state monitoring means (CCBS) monitoring the operation state of said second subscriber station (TE, MT, SS2), said operation state monitoring means (CCBS) providing a busy state indication to said first subscriber station (TE, MS1, SS1) when the second subscriber station is in said busy state.

39. A method according to claim 27, wherein said blocking is carried out simultaneously for a plurality of first subscriber stations or a plurality of applications running on a terminal equipment thereof.

40. A method according to claim 27, comprising the following further step: sending back (S210, S211, S306, S402) application/terminal equipment in the first subscriber station (TE, MS1, SS1) requesting the call set-up a busy state indication ("busy") when the second subscriber station (TE, MS1, SS1) is in a busy state.

41. A method according to claim 40, comprising the following further steps: delaying the blocking of said call set-up request and the sending of said busy state indication to the first subscriber station (TE, MS1, SS1) for a predetermined delay time interval ($\Delta T$) in response to a receipt of a call set-up request; and queuing said received call set-up request from the first subscriber station (TE, MS1, SS1) for said predetermined delay time interval ($\Delta T$).

42. A method according to claim 40, wherein the sending back of said busy state indication ("busy") to the first subscriber station (SS1) is delayed for a predetermined time interval.

43. A method for controlling the set-up of calls between a first subscriber station (TE, MT, SS1) and a second subscriber station (TE, MT, SS2) connected to a telecommunication network (NET), comprising the following steps:
- a) monitoring (S204) an operation state of said second subscriber station (TE, MT, SS2) and detecting whether or not the second subscriber station is in a busy state;
- b) repeating (S209, S210, S202, S203) a call set-up request by the first subscriber station (TE, MT, SS1) if a busy state of the second subscriber station (TE, MT, SS2) is determined (S205);

c) detecting (S209) whether or not a call set-up request relates to a call set-up for which a call set-up request was previously issued by the first subscriber station (TE, MT, SS1);

d) blocking (S208) a call set-up request issued by the first subscriber station (TE, MS1, SS1) to set up a call to the second subscriber station (TE, MS2, SS2) from being transferred to the exchange means (GMSC, MSC/VLR, HLR) of said telecommunication network (NET) when it is detected (S209) that the call set-up request relates to a call set-up for which a call set-up request was previously issued by the first subscriber station (TE, MT, SS1), and it is determined (S205) that the second subscriber station (TE, MT, SS2) is in a busy state; and e) deactivating (S212) said blocking and transferring (S106, S206) said call set-up request to said exchange means (GMSC, MSC/VLR, HLR) after it is determined that the operation state of the second subscriber station (TE, MS2, SS2) changes from a busy state to an idle state.

44. A telecommunication system (SYS) including at least a first and second subscriber station (TE, MS1, SS1; TE, MS2, SS2) connected to a telecommunication network (NET) having an exchange means (GMSC, MSC/VLR, HLR) for setting up calls between the first subscriber station (TE, MT, SS1) and the second subscriber station (TE, MT, SS2), comprising at least one control apparatus (AGNT) according to claim 43.

45. A telecommunication system (SYS) including at least a first and second subscriber station (TE, MS1, SS1; TE, MS2, SS2) connected to a telecommunication network (NET) having an exchange means (GMSC, MSC/VLR, HLR) for setting up calls between the first subscriber station (TE, MT, SS1) and the second subscriber station (TE, MT, SS2), comprising:

a) a recall detection means (RC-DET) adapted to check if a received call set-up request relates to a call set-up for which a previous call set-up request has already been issued by said first subscriber station (TE, MS1, SS1);

b) a call set-up request blocking means (RC-BLK) for blocking said received call set-up request issued by the first subscriber station (TE, MS1, SS1) to set up a call to the second subscriber station (TE, MS2, SS2) from being transferred to the exchange means (GMSC, MSC/VLR, HLR) of the telecommunication network (NET); and c) an activation means (BLK-ACT) for activating said call set-up request blocking means (RC-BLK) when said second subscriber station (TE, MS2, SS2) is in a busy state.

46. A telecommunication system (SYS) according to claim 45, comprising a call handling means (RC-HDL) for deactivating said call set-up request blocking means (RC-BLK) when the second subscriber station (TE, MS2, SS2) changes from said busy state to an idle state.

47. A telecommunication system (SYS) according to claim 46, wherein said recall detection means (RC-DET) is adapted to detect whether said received call set-up request issued by the first subscriber station (TE, MS1, SS1) is a repeated call set-up request issued by said automatic recall means (ARC) of said first subscriber station.

48. A telecommunication system (SYS) according to claim 47, wherein said recall detection means (RC-DET) compares a set of call parameters contained in a call set-up request with sets of call parameters stored in a call parameter memory (MEM) storing call parameters for previous call set-up requests and detects that a call set-up request has been issued by the first subscriber station (TE, MS1, SS1) repeatedly to the same second subscriber station (TE, MS2, SS2) if the call parameters match.

49. A telecommunication system (SYS) according to claim 47, wherein said recall detection means (RC-DET) detects a time interval ($\Delta T$) between successive call set-up requests issued by the first subscriber station (TE, MS1, SS1) and detects that a call set-up request has been issued by said automatic recall means (ARC) of the first subscriber if the time interval ($\Delta T$) is within a predetermined time interval (30 s, 60 s).

50. A telecommunication system (SYS) according to claim 45, wherein said telecommunication network (NET) includes an operation state monitoring means (CCBS) monitoring the operation state of the second subscriber station (TE, MT, SS2), said operation state monitoring means (CCBS) outputting a busy state indication to said activation means (BLK-AC) when the second subscriber station is in said busy state.

51. A telecommunication system (SYS) according to claim 45, wherein the first subscriber station (TE, MT, SS1) comprises an automatic recall means (ARC) for repeating a call set-up request to the second subscriber station (TE, MT, SS2).

52. A telecommunication system (SYS) according to claim 45, wherein said call set-up request issued by the first subscriber station (TE, MS1, SS1) is a speech call set-up request to set up a speech call between the first and second subscriber station (TE, MT, SS1; TE, MT, SS2).

53. A telecommunication system (SYS) according to claim 45, wherein the first subscriber station (TE, MT, SS1) comprises a telephone equipment (MT, SS1) and a terminal equipment (TE) connected thereto, wherein said call set-up request is issued by said terminal equipment (TE) in order to set-up a data call between said terminal equipment (TE) and the second subscriber station (TE, MT, SS2).

54. A telecommunication system (SYS) according to claim 53, wherein said call set-up request blocking means (RC-BLK) and said activation means (ACT) are arranged in said terminal equipment (TE) or said telephone equipment (MT, SS1).

55. A telecommunication system (SYS) according to claim 53, wherein said telephone equipment (MT, SS1) is a mobile termination (MT, SS1) and the telecommunication network (NET) comprises one or more networks selected from the group of networks comprising a public land mobile radio network (PLMN) and a public switched telephone network (PSTN).

56. A telecommunication system (SYS) according to claim 45, wherein at least one of the first and second subscriber stations (TE, MT, SS1; TE, MT, SS2) is a mobile station of a public land mobile radio communication network (PLMN).

57. A telecommunication system (SYS) according to claim 45, comprising a delay means (DLY) for delaying the activation of said call set-up request blocking means (RC-BLK) and/or the sending of said busy state indication to the first subscriber station (TE, MS1, SS1) in response to a receipt of a call set-up request for a predetermined delay time interval; and a queuing means (QUE) for queuing said received call set-up request received from the first subscriber station (TE, MS1, SS1) for said predetermined delay time interval.

58. A telecommunication system (SYS) according to claim 45, comprising a means for sending back to the application/terminal equipment in the first subscriber station (TE, MS1, SS1) requesting the call set-up a busy state indication ("busy") when the second subscriber station (TE, MS1, SS1) is in a busy state.

59. A telecommunication system (SYS) according to claim 58, comprising a delay means (DLY) for delaying the sending back of said busy state indication ("busy") to the first subscriber station (SS1) for a predetermined time interval.

60. A telecommunication system (SYS) including at least a first and second subscriber station (TE, MS1, SS1; TE, MS2, SS2) connected to a telecommunication network (NET) having an exchange means (GMSC, MSC/VLR, HLR) for setting up calls between the first subscriber station (TE, MT, SS1) and the second subscriber station (TE, MT, SS2) and an operation state monitoring means (CCBS) monitoring the operation state of at least the second subscriber station (TE, MT, SS2); comprising:

a) a recall detection means (RC-DET) for detecting whether a call set-up request is a call set-up request issued by an automatic recall means (ARC) of the first subscriber station (TE, MT, SS1);

b) a recall blocking means (RC-BLK) for blocking a call set-up request issued by said automatic recall means (ARC) of the first subscriber station (TE, MS1, SS1) to set up a call to the second subscriber station (TE, MS2, SS2) from being transferred to the exchange means (GMSC, MSC/VLR, HLR) of the telecommunication network (NET);

c) an activation means (BLK-ACT) for activating said recall blocking means (RC-BLK) for blocking call set-up requests from the first subscriber station (TE, MS1, SS1) when
said recall detection means (RC-DET) detects that said call set-up request is issued by said automatic recall means (ARC); and
said operation state monitoring means (CCBS) outputs a busy state indication for the second subscriber station (TE, MT, SS2); and d) a recall handling means (RC-HDL) for deactivating said recall blocking means (RC-BLK) when an output from said operation state monitoring means (CCBS) changes a busy state indication for the called second subscriber station (TE, MT, SS2) to an idle state indication.

61. A subscriber station of a telecommunication system (SYS) including an operation state monitoring means (CCBS) monitoring the operation state of subscriber stations (TE, MS1, SS1; TE, MT, SS2) connected thereto, comprising:

a) an automatic recall means (ARC) for repeating a call set-up request to another subscriber station (MT, SS2) if the operation state monitoring means (MON, CCBS) provides a busy state indication for said another subscriber station (TE, MT, SS2);

b) a call set-up request blocking means (RC-BLK) for blocking a call set-up request issued by the subscriber station (TE, MS1, SS1) to set up a call to said another subscriber station (TE, MS2, SS2) from being transferred to the exchange means (GMSC, MSC/VLR, HLR) of said telecommunication network (NET); and c) an activation means (BLK-ACT) for activating said call set-up request blocking means (RC-BLK) when said another subscriber station (TE, MS2, SS2) is in a busy state.

62. A subscriber station according to claim 61 wherein the subscriber station is a mobile station (TE, MT, SS1) and the telecommunication system (SYS) includes a mobile radio communication network (NET, PLMN).

63. A subscriber station of a telecommunication system (SYS) including an operation state monitoring means (CCBS) monitoring the operation state of subscriber stations (TE, MS1, SS1; TE, MT, SS2) connected thereto, comprising:

a) an automatic recall means (ARC) for repeating a call set-up request to another subscriber station (MT, SS2) if the operation state monitoring means (MON, CCBS) provides a busy state indication for another subscriber station (TE, MT, SS2);

b) a recall detection means (RC-DET) for detecting whether a call set-up request is a call set-up request issued by said automatic recall means (ARC) of said subscriber station (TE, MT, SS1);

c) a recall blocking means (RC-BLK) for blocking a call set-up request issued by said automatic recall means (ARC) of said subscriber station (TE, MS1, SS1) to set up a call to said another subscriber station (TE, MS2, SS2) from being transferred to the exchange means (GMSC, MSC/VLR, HLR) of said telecommunication network (NET);

d) an activation means (BLK-ACT) for activating said recall blocking means (RC-BLK) for blocking call set-up requests, when
said recall detection means (RC-DET) detects that said call set-up request is issued by said automatic recall means (ARC); and
the operation state monitoring means (CCBS) outputs a busy state indication for said another subscriber station (TE, MT, SS2); and e) a recall handling means (RC-HDL) for deactivating said recall blocking means (RC-BLK) when an output from said operation state monitoring means (CCBS) changes from a busy state indication for said called another subscriber station (TE, MT, SS2) to an idle state indication.

* * * * *